(12) United States Patent
Viswanathan et al.

(10) Patent No.: US 11,651,308 B1
(45) Date of Patent: May 16, 2023

(54) METHODS AND APPARATUS FOR PROVIDING TELEOPERATIONS FUNCTIONALITY IN A DISTRIBUTED MANNER

(71) Applicant: Nuro, Inc., Mountain View, CA (US)

(72) Inventors: Abishek Viswanathan, San Francisco, CA (US); Varun Krish Mohan, San Jose, CA (US); Paul Michael White, Mountain View, CA (US)

(73) Assignee: Nuro, Inc., Mountain View, CA (US)

( * ) Notice: Subject to any disclaimer, the term of this patent is extended or adjusted under 35 U.S.C. 154(b) by 0 days.

(21) Appl. No.: 17/224,995

(22) Filed: Apr. 7, 2021

Related U.S. Application Data

(60) Provisional application No. 63/008,513, filed on Apr. 10, 2020.

(51) Int. Cl.
*G06Q 10/00* (2023.01)
*G06Q 10/0631* (2023.01)
*G05D 1/00* (2006.01)
*G06Q 10/0639* (2023.01)

(52) U.S. Cl.
CPC ... *G06Q 10/063112* (2013.01); *G05D 1/0027* (2013.01); *G05D 1/0038* (2013.01); *G06Q 10/0639* (2013.01); *G06Q 10/063114* (2013.01); *G05D 2201/0213* (2013.01)

(58) Field of Classification Search
None
See application file for complete search history.

(56) References Cited

U.S. PATENT DOCUMENTS

2006/0072505 A1\* 4/2006 Carrillo .................. H04L 41/042
370/331
2009/0125163 A1\* 5/2009 Duggan ............... G05D 1/0061
701/2
2009/0326735 A1\* 12/2009 Wood ................... G05D 1/0088
701/2

(Continued)

OTHER PUBLICATIONS

Taub, Eric, Sleepy Behind the Wheel? Some Cars Can Tell, Mar. 16, 2017, NY Times, https://www.nytimes.com/2017/03/16/automobiles/wheels/drowsy-driving-technology.html, p. 1-3. (Year: 2017).\*

*Primary Examiner* — Joseph M Waesco

(57) ABSTRACT

According to one aspect, a method includes identifying a machine arranged to be monitored using teleoperations, and obtaining a first request from a first teleoperations arrangement to monitor the machine. The first teleoperations arrangement includes a first teleoperations equipment. The method also includes determining whether to accept the first request from the first teleoperations arrangement, wherein determining whether to accept the first request from the first teleoperations arrangement includes verifying that a first operator of the first teleoperations equipment is certified by the platform and verifying that the teleoperations equipment meets a standard. The first request is accepted when it is determined that the request is to be accepted, wherein accepting the first request includes assigning the first teleoperations arrangement to monitor the machine during a first shift. Finally, the method includes monitoring the first teleoperations arrangement and the machine during the first shift.

20 Claims, 19 Drawing Sheets

(56) References Cited

U.S. PATENT DOCUMENTS

| | | | |
|---|---|---|---|
| 2011/0184590 A1* | 7/2011 | Duggan | G05D 1/0088 701/2 |
| 2013/0345920 A1* | 12/2013 | Duggan | G05D 1/0061 701/23 |
| 2014/0330605 A1* | 11/2014 | Connolly | G06Q 10/063116 705/7.16 |
| 2014/0354809 A1* | 12/2014 | Shondel | H04N 7/185 348/144 |
| 2016/0046374 A1* | 2/2016 | Kugelmass | H04L 67/12 701/8 |
| 2016/0117929 A1* | 4/2016 | Chan | G06Q 50/30 701/3 |
| 2016/0117931 A1* | 4/2016 | Chan | B64C 39/024 701/120 |
| 2016/0117933 A1* | 4/2016 | Chan | G08G 5/0069 705/317 |
| 2016/0246297 A1* | 8/2016 | Song | H04B 7/18506 |
| 2016/0257401 A1* | 9/2016 | Buchmueller | G01C 21/343 |
| 2016/0275801 A1* | 9/2016 | Kopardekar | G08G 5/0082 |
| 2016/0371975 A1* | 12/2016 | Yamamoto | G08G 1/0129 |
| 2017/0286886 A1* | 10/2017 | Halepatali | B60W 60/0025 |
| 2017/0286887 A1* | 10/2017 | Moran | G08G 5/0069 |
| 2018/0224854 A1* | 8/2018 | Mullan | B64C 39/024 |
| 2018/0247266 A1* | 8/2018 | Knapp | G06Q 10/08355 |
| 2018/0356814 A1* | 12/2018 | Brooks | B61L 27/14 |
| 2019/0147388 A1* | 5/2019 | Alexander | G06V 30/418 705/7.14 |
| 2019/0243359 A1* | 8/2019 | Cross | G05D 1/0274 |
| 2020/0004242 A1* | 1/2020 | Kim | G05D 1/0088 |
| 2020/0062267 A1* | 2/2020 | Magzimof | B60W 60/005 |
| 2020/0094850 A1* | 3/2020 | Chi | G05D 1/0072 |
| 2020/0272145 A1* | 8/2020 | Kinoshita | H04W 24/02 |
| 2020/0363797 A1* | 11/2020 | Brooks | A61B 5/318 |
| 2021/0001864 A1* | 1/2021 | Hutchings | B60W 50/14 |

* cited by examiner

METHODS AND APPARATUS FOR PROVIDING TELEOPERATIONS FUNCTIONALITY IN A DISTRIBUTED MANNER

CROSS-REFERENCE TO RELATED APPLICATION

This application claims the benefit of priority under 35 U.S.C. § 119 to U.S. Provisional Patent Application No. 63/008,513, filed Apr. 10, 2020, entitled "METHODS AND APPARATUS FOR PROVIDING TELEOPERATIONS FUNCTIONALITY IN A DISTRIBUTED MANNER," which is incorporated herein by reference in its entirety.

TECHNICAL FIELD

The disclosure relates to providing teleoperations capabilities for devices and/or vehicles. More particularly, the disclosure relates to providing a distributed teleoperations platform which allows for teleoperators to provide support for devices and/or vehicles at distributed locations.

BACKGROUND

Autonomous vehicles often operate using teleoperations, or under the watchful eye of teleoperators who are ready to assume control of the vehicles should the need arise. Teleoperators often have consoles, or teleoperations equipment, which effectively mimic a driving console in a vehicle, and are provided with a view of what the vehicle sees. Similarly, robotic devices may also be operated through teleoperations.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
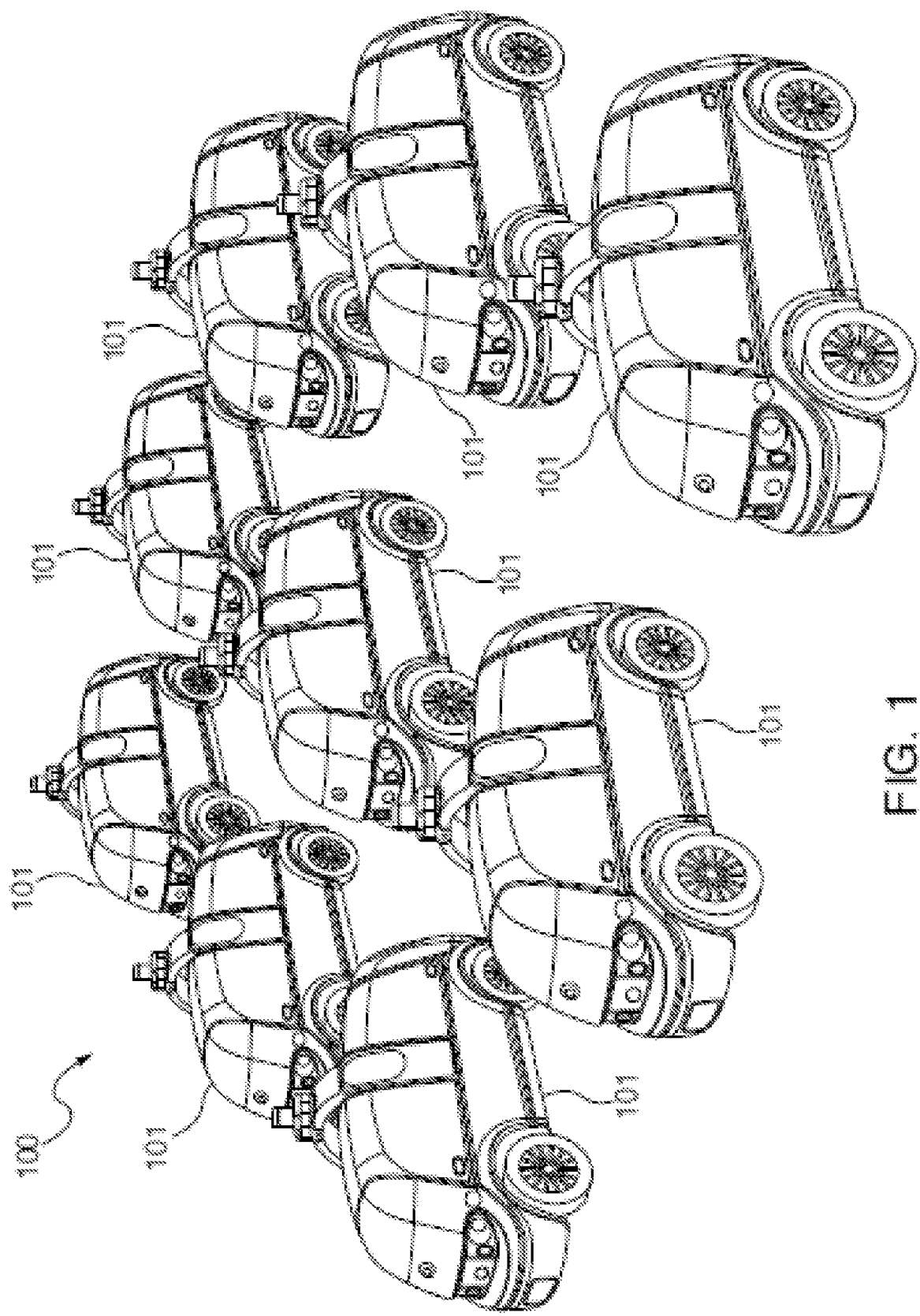
FIG. 1 is a diagrammatic representation of an autonomous vehicle fleet in accordance with an embodiment.

A distributed teleoperations platform allows individuals to remotely operate vehicles and/or robotic devices, as part of a distributed network of teleoperators. A distributed teleoperations platform allows teleoperators to monitor and/or to control vehicles and/or robot devices from remote locations such as their homes. Teleoperators may procure teleoperations equipment for use at remote locations, thereby enabling them to readily work at their convenience and at convenient locations.

According to an embodiment, a method includes identifying a machine, the machine being arranged to be monitored using teleoperations, wherein the machine is identified by a platform. The method also includes obtaining a first request from a first teleoperations arrangement to monitor the machine, the first teleoperations arrangement including a first teleoperations equipment, the request being obtained on the platform. It is determined whether to accept the first request from the first teleoperations arrangement, wherein determining whether to accept the first request from the first teleoperations arrangement includes performing a first verification on the first teleoperations arrangement, and wherein performing the first verification includes verifying that a first operator of the first teleoperations equipment is certified by the platform and verifying that the teleoperations equipment meets a standard. The first request is accepted when it is determined that the request is to be accepted, wherein accepting the first request includes assigning the first teleoperations arrangement to monitor the machine during a first shift. Finally, the method includes monitoring the first teleoperations arrangement and the machine during the first shift.

According to yet another embodiment, a platform management system that is part of a distributed teleoperations platform includes a processor arrangement, a verification module including a first logic arranged to be executed by the processor arrangement, an assignment module including a second logic arranged to be executed by the processor arrangement, and a monitoring module including a third logic arranged to be executed by the processor arrangement. The assignment module causes a first assessment of a first teleoperations arrangement included in the distributed teleoperations platform, the first teleoperations arrangement including a first teleoperations equipment and a first operator, wherein the first assessment determines whether the first teleoperations system is suitable for teleoperating a first vehicle by verifying the first teleoperations equipment and the first operator. When the first assessment determines that the first teleoperations arrangement is suitable for teleoperating the first vehicle, the assignment module causes the first teleoperations arrangement to be assigned to teleoperate the first vehicle. The monitoring module monitors the first teleoperations arrangement and the first vehicle when the first teleoperations arrangement is assigned to teleoperate the first vehicle.

DESCRIPTION

As the use of machines such as autonomous vehicles and robotic devices increases, the need for the vehicles and the robotic devices to operate safely is becoming more important. Teleoperations systems, or a system that may be used to allow for the remote control of a machine such as a vehicle or a robotic device, may be used in many situations to increase the likelihood that the vehicle or the robotic device may operate at a relatively high level of safety.

In one embodiment, a distributed teleoperations platform which supports teleoperations allows individuals to remotely operate vehicles and/or robotic devices, as part of a distributed network of teleoperators. Such a platform allows autonomous vehicle and robot manufacturers, as well as vehicle and robot fleet operators, to access human labor pools through a distributed network of teleoperators for and when human monitoring or intervention may be desirable. As a result, manufacturers and fleet operators may relatively safely deploy technology substantially without the need to set up large, capital-intensive, and/or centralized command centers.

A vehicle that may be remotely operated as part of a distributed teleoperations platform may generally be part of an autonomous vehicle fleet. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
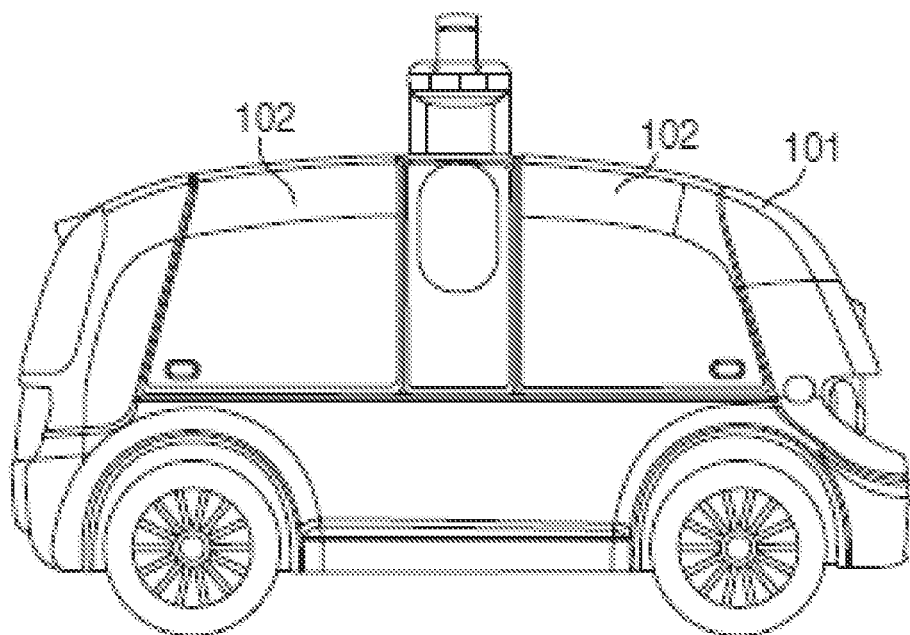
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
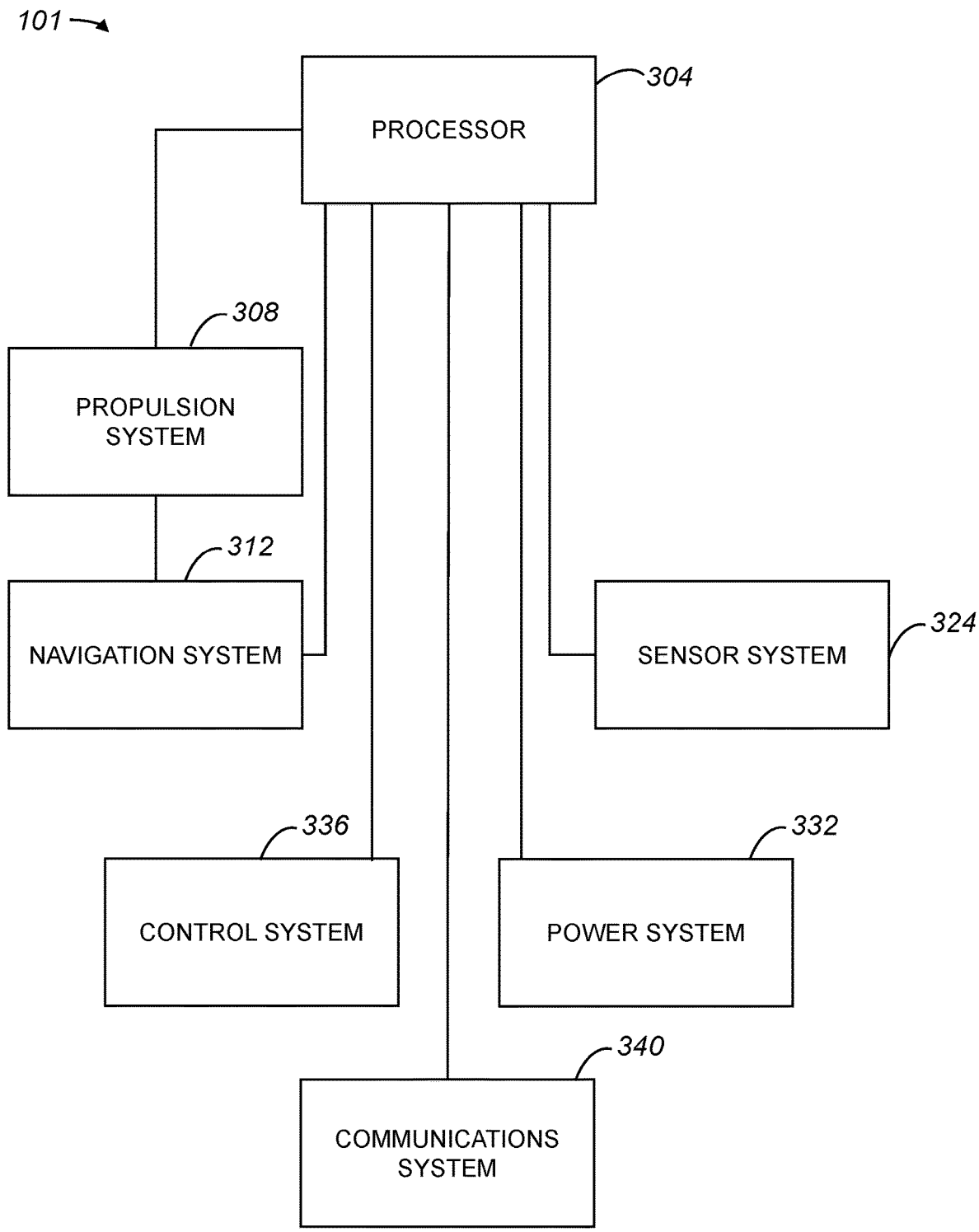
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to, or otherwise supported on, a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) and/or a teleoperations system that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system.

Figure 4:
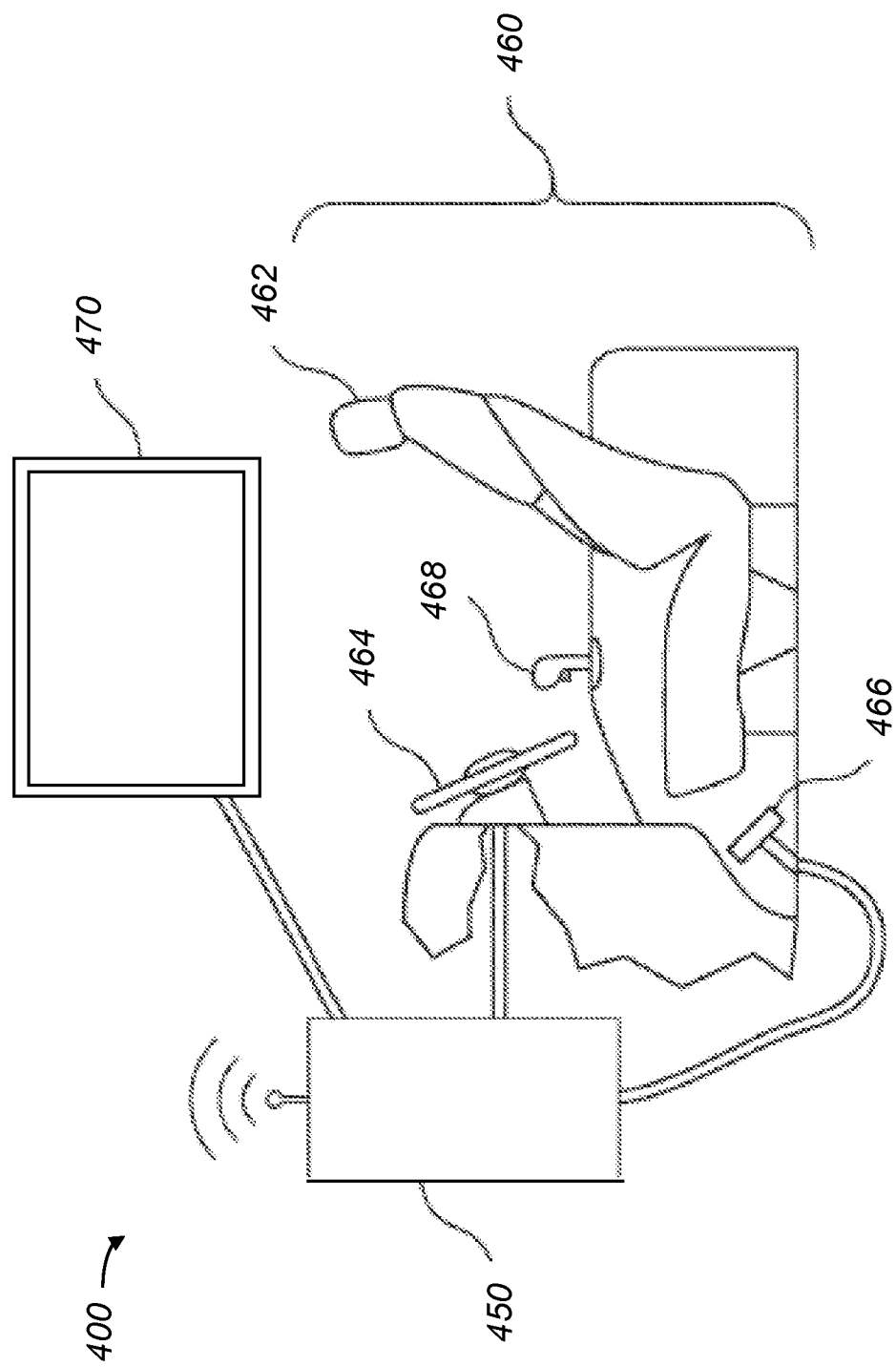
FIG. 4 is a remote human operator system suitable for use in remotely operating a vehicle, e.g., an autonomous vehicle, in accordance with an embodiment.

FIG. 4 is a remote human operator system or teleoperations system suitable for use in remotely operating a vehicle, e.g., an autonomous vehicle, in accordance with an embodiment. A system 400 includes communication/processing equipment 450 and a human operator station 460. Human operator station 460 may resemble, in one embodiment, a driver station in a typical automobile, and may include a driver seat 462, a steering wheel 464, acceleration and brake pedals 466, and a gear shifter 468. Human operator station 460 also includes a visual interface 470 that is configured to allow a human operator to view the environment in which an autonomous vehicle that is to be driven or otherwise controlled by human operator station 460 is driving.

Visual interface 470 is generally any device or component which allows visual data, e.g., visual data which depicts an environment around a vehicle that is arranged to be remotely operated using system 400. In one embodiment, visual interface 470 is in the form of a virtual-reality (VR) or augmented-reality (AR) headset. Visual interface 470 is not limited, however, to being a VR or an AR headset. By way of example, human operator station 460 may include one or more display screens. Display screens may be LED, LCD, and/or OLED display screens or monitors.

Human operator station 460 may be configured to have the approximate touch response of an actual driver station in an automobile. For example, steering wheel 464 may be configured to have a touch response that is similar to that of power steering in an actual automobile, and pedals 466 may be configured to approximate the resistance of pedals in an actual automobile.

Steering wheel 464, acceleration and brake pedals 466, and gear shifter 468 may be connected to or otherwise coupled to communication/processing equipment 450. Communication/processing equipment 450 enables communication between human operator station 460 and the autonomous vehicle that is configured to be remotely operated using human operator station 460. As shown, human operator station 460 may be connected to communication/processing equipment 450 by physical cables and connections. It should be appreciated, however, that human operator station 460 may instead be wirelessly coupled to communication/processing equipment 450 using any suitable method including, but not limited to including, Bluetooth and Wi-Fi. In addition, while human operator station 460 may be substantially directly connected to communication/processing equipment 450, human operator station 460 may instead be coupled to communication/processing equipment 450 through intermediate devices and/or networks, e.g., wireless and/or cellular networks.

Communication/processing equipment 450 may establish communications, as for example communications with an autonomous vehicle and/or with visual interface 470, using various communications technologies including, but not limited to including, IEEE 802.11x (Wi-Fi), cellular 3G/4G/5G, wired communications, and/or other wired or wireless communication protocols. It should be appreciated that communication/processing equipment 450 generally includes one or more processors, memories, machine instructions, and/or hardware for processing visual information for display by the visual interface 470. Substantially any suitable method may be used to communicate, to process, and to display visual information.

Communication/processing equipment 450 is generally arranged to process signals from human operator station 460, and to translate the signals into control instructions for controlling an autonomous vehicle. In one embodiment, communication/processing equipment 450 is arranged to provide teleoperations capabilities. The signals provided by communication/processing equipment 450 may include control instructions for controlling a conveyance system that is part of a propulsion system of the autonomous vehicle to cause the autonomous vehicle to drive or to otherwise travel.

When a human operator turns or steers steering wheel 464, communication/processing equipment 450 may send corresponding control instructions to an autonomous vehicle to instruct the autonomous vehicle to turn or to drive in the direction indicated by the way the human operator steers steering wheel 464. In addition, when a human operator accelerates or brakes using pedals 466 of the operator station 460, communication/processing equipment 450 sends corresponding control instructions to the autonomous vehicle to instruct the autonomous vehicle to accelerate or brake, respectively.

Figure 5:
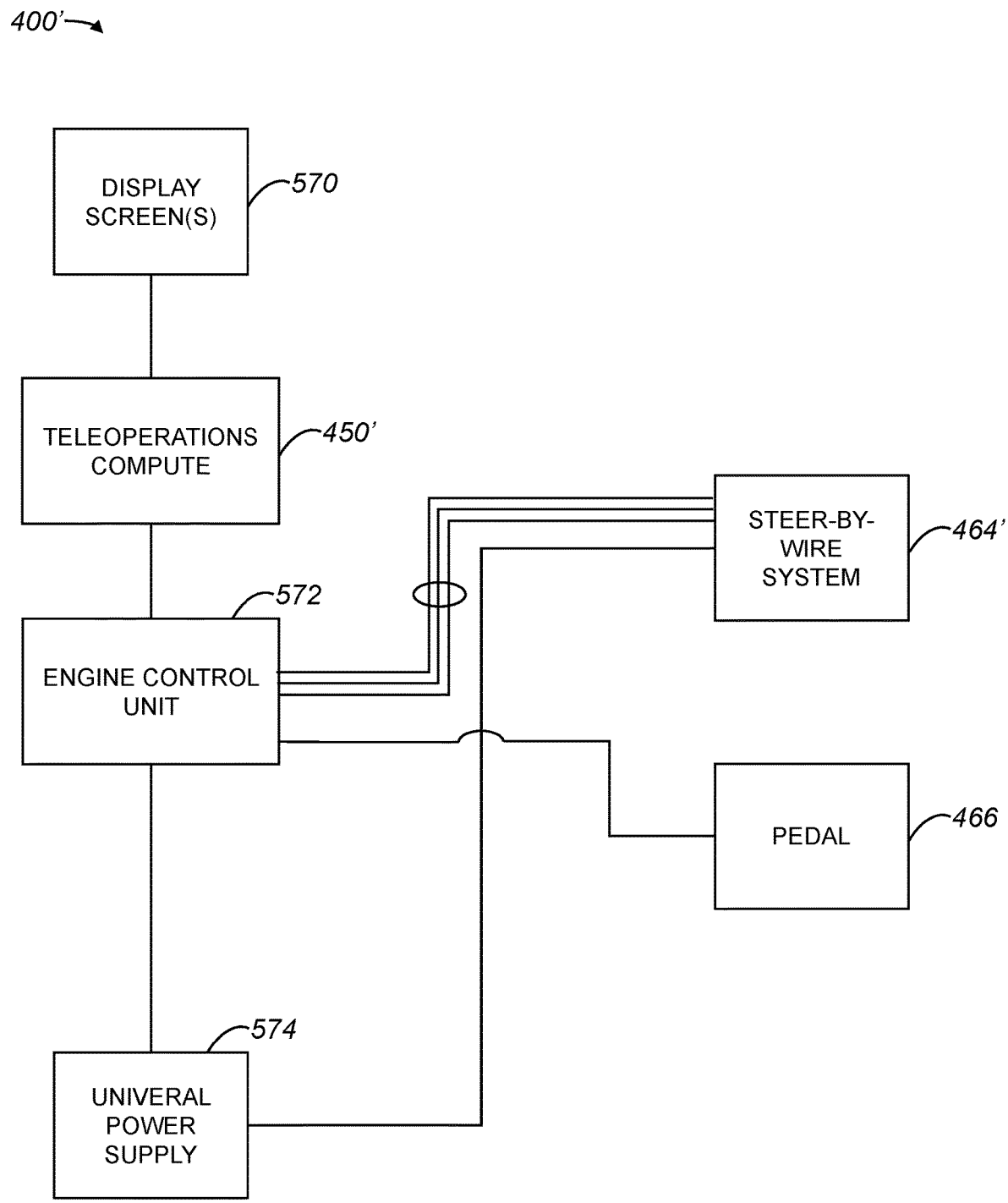
FIG. 5 is a block diagram representation of a remote human operator system, e.g., remote human operator system 400 of FIG. 4, in accordance with an embodiment.

FIG. 5 is a block diagram representation of a remote human operator system, e.g., remote human operator system or teleoperations system 400 of FIG. 4, in accordance with an embodiment. A remote human operator system or teleoperations system 400' that may remotely operate a vehicle includes a visual interface that includes at least one display screen 570, a teleoperations compute 450', an engine control unit 572, a steer-by-wire system 464', at least one pedal 466, and a universal power supply 574.

Display screen 570 may display a view of surroundings of a vehicle that is being operated by or monitored by teleoperations system 400'. Teleoperations compute 450' provides communication/processing equipment, and may communicate with engine control unit 572 over a CAN bus. Engine control unit 572 takes power from universal power supply 574, and communicates with steer-by-wire system 464' and pedal 466 to facilitate the control of a vehicle. Steer-by-wire system 574 also draws power from universal power supply 574.

Figure 6:
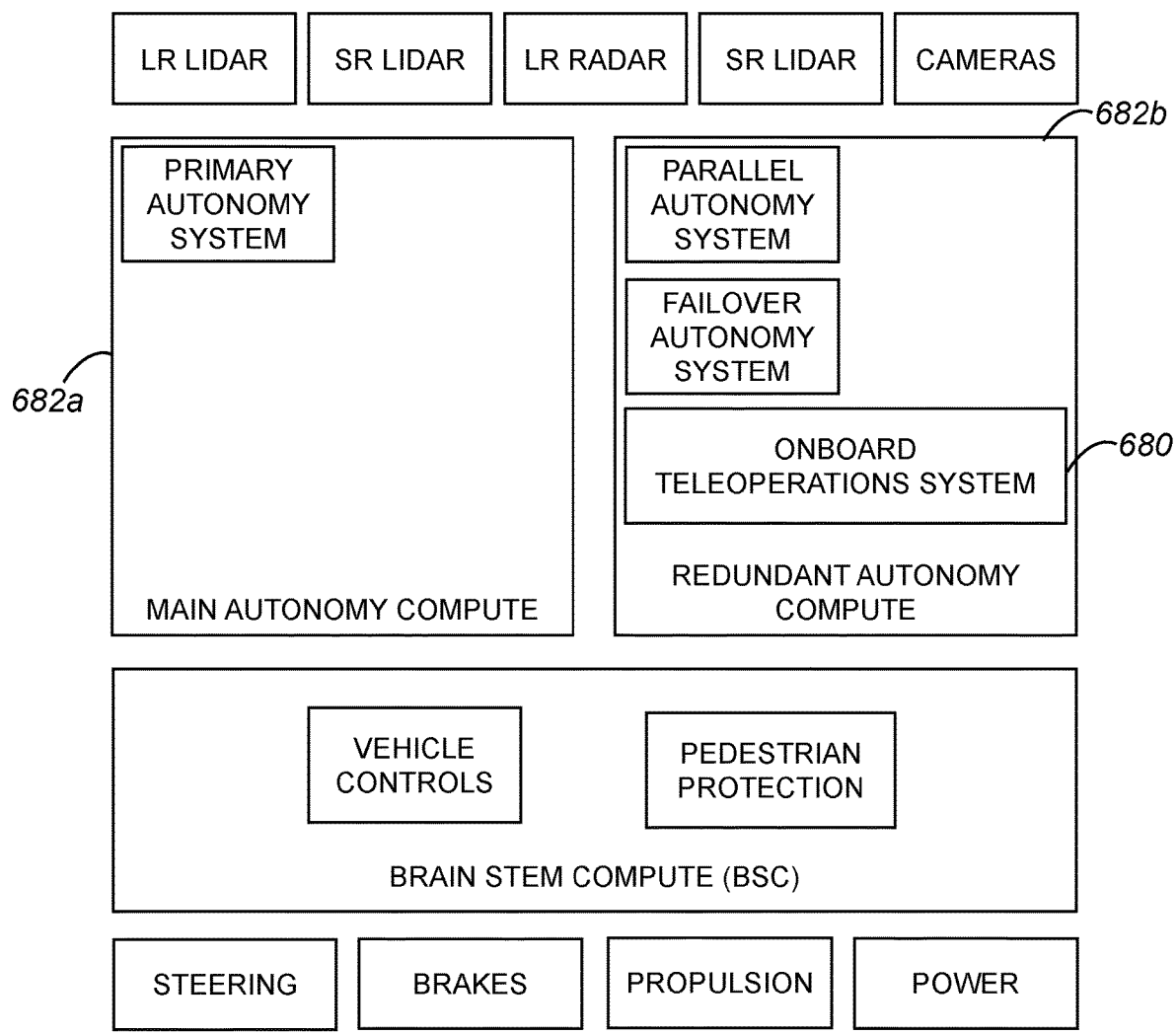
FIG. 6 is a block diagram representation of an autonomous vehicle in accordance with an embodiment of the present invention.

An autonomous vehicle that may be operated by a remote human operator system or a teleoperations system typically includes an onboard teleoperations system that communicates with the remote human operator system. FIG. 6 is a block diagram representation of an autonomous vehicle in accordance with an embodiment of the present invention. An autonomous vehicle 601 includes a main autonomy compute 682a that provides vehicle 601 with the ability to operate autonomously and/or semi-autonomously. Vehicle 601 also includes a redundant autonomy computer 682b that is arranged to operate vehicle 601 if main autonomy compute 682a may not be used. Redundant autonomy computer 682b includes an onboard teleoperation system 680 that cooperates with a teleoperation system operated by a remote human operator, i.e., a teleoperator, such as teleoperation system 400' of FIG. 5.

Figure 7:
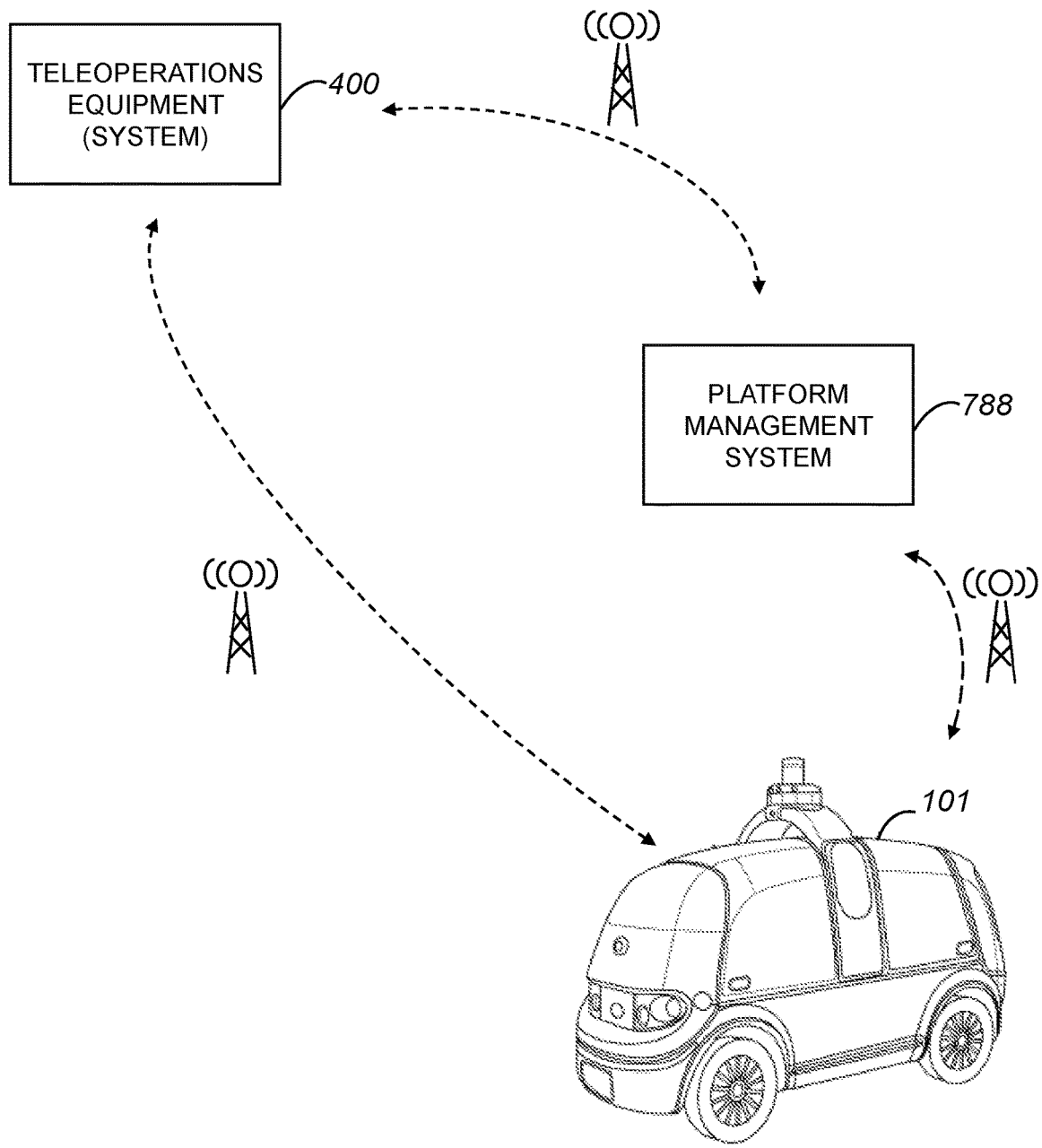
FIG. 7 is a diagrammatic representation of an overall distributed teleoperations platform which includes a vehicle, e.g., vehicle 101 of FIG. 2, in accordance with an embodiment.

A distributed teleoperations platform generally enables teleoperators physically located at different locations to monitor and to control autonomous vehicles. FIG. 7 is a diagrammatic representation of an overall distributed teleoperations platform in accordance with an embodiment. An overall distributed teleoperations platform 786 includes at least one instance of teleoperations equipment 400, a platform management system 788, and at least one autonomous vehicle such as autonomous vehicle 101 of FIG. 2 or an autonomous vehicle 601 of FIG. 6.

Platform management system 788, which may include fleet management capabilities arranged to dispatch vehicles 101 included in a fleet to complete deliveries and other tasks, is arranged to assign a teleoperator using teleoperations equipment 400 to provide remote operations for vehicle 101. Parameters analyzed to identify a teleoperator suitable for providing remote operations may vary widely. Parameters may include, but are not limited to including, familiarity with a specific location such as a city, familiarity with a specific driving environment such as familiarity with driving in inclement weather, expected reaction times based on previous performance of the teleoperator, familiarity with the language used in a particular environment, and/or licensing for specific locations Platform management system 788 is also generally arranged to monitor a teleoperator and teleoperations equipment 400 to ensure that the teleoperator is operating competently, and that the teleoperations equipment 400 is functioning at an acceptable level. In other words, platform management system 788 substantially ensures that a teleoperator and teleoperations equipment 400 are both operating safely. Platform management system 788 generally includes, but is not limited to including, a processor, a communications interface, a memory, and a monitoring apparatus that allows platform management system 788 to monitor teleoperations equipment 400 and a teleoperator. Platform management system 788 may generally certify a teleoperator as having skills to teleoperate a vehicle.

In one embodiment, to substantially ensure that a teleoperator using teleoperations equipment 400 is authorized to use teleoperations equipment 400, platform management system 788 may monitor the teleoperator. For example, platform management system 788 may be arranged to obtain visual data relating to the teleoperator, and may use the visual data to verify or otherwise authenticate the teleoperator to remotely operate vehicle 101.

Teleoperations equipment 400 may control, e.g., drive, vehicle 101, or may monitor vehicle 101 and take over the control of vehicle 101 on an as-needed basis. Teleoperations equipment 400, when effectively assigned by platform management system 788 to control and/or to monitor vehicle 100, communicates substantially directly with vehicle 101 such that teleoperations equipment 400 may be used by a teleoperator to control and/or to monitor vehicle 101.

In general, communications between platform management system 788, teleoperations equipment 400, and vehicle 101 may be wireless. For example, communications may occur over wireless networks such as cellular networks, Wi-Fi networks, and/or 3G/4G/5G networks. In one embodiment, a Secure Sockets Layer (SSL) may be used to establish an encrypted link between teleoperations equipment 400 and vehicle 101.

Figure 8:
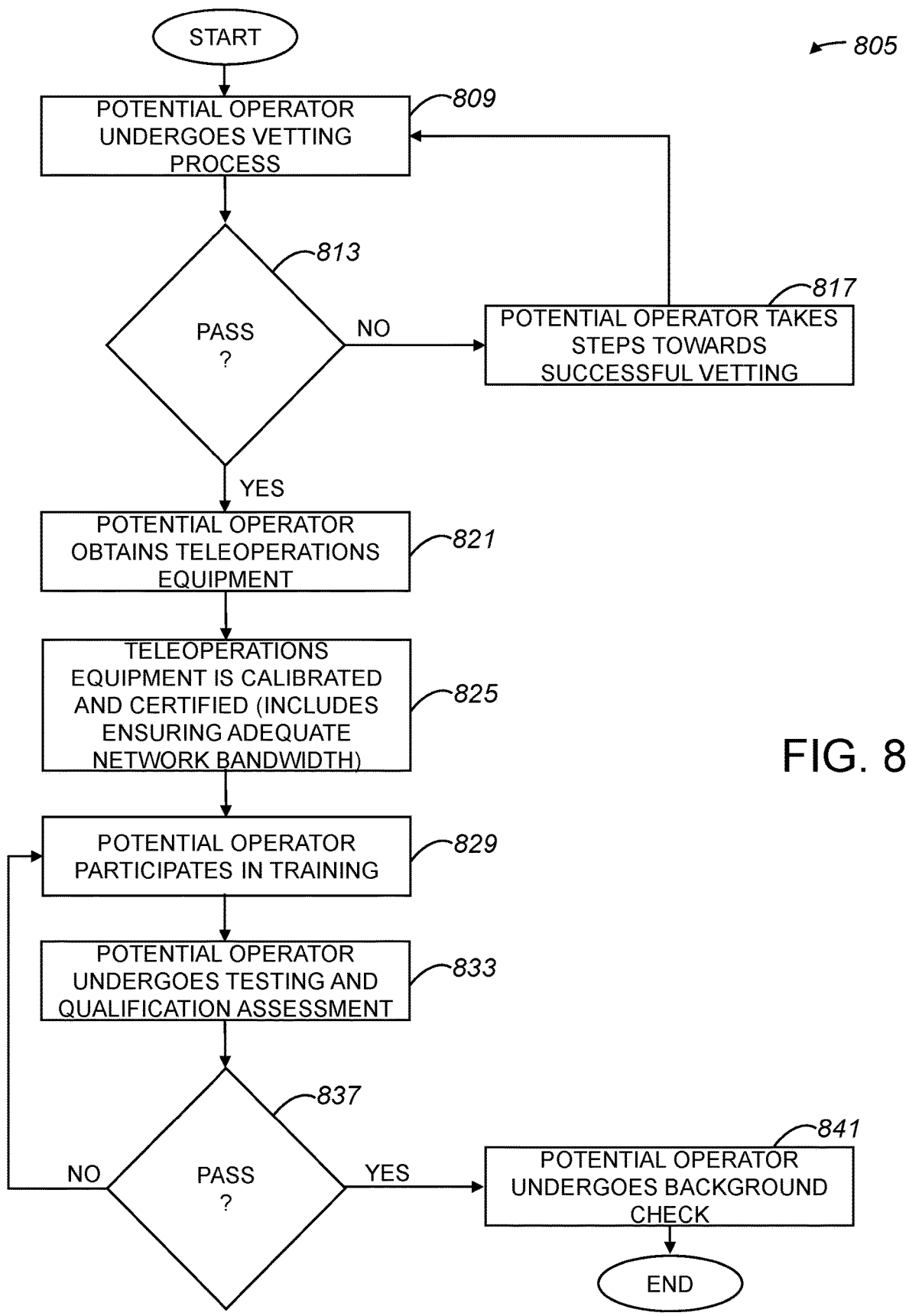
FIG. 8 is a process flow diagram which illustrates a method of certifying a potential operator as a teleoperator in accordance with an embodiment.

Before a teleoperator is allowed to operate teleoperations equipment such as teleoperations equipment located at his or her residence, the teleoperator must first be certified as capable or otherwise licensed to operate teleoperations equipment. Certifying a teleoperator, as well as teleoperations equipment used by the teleoperator, increases the likelihood that the teleoperator may safely control and/or monitor a vehicle. A platform management system of an overall distributed teleoperations platform may, in one embodiment, certify potential operators. FIG. 8 is a process flow diagram which illustrates a method of certifying a potential operator as a teleoperator in accordance with an embodiment. A method 805 of certifying a potential operator to be a teleoperator begins at a step 809 in which a potential operator undergoes a vetting process to determine whether the potential operator may be suitable to undergo training to become a teleoperator. Such a vetting process may include, but is not limited to including, determining whether the potential operator meets substantially minimum requirements relating to whether the potential operator has a valid driver's license, has a particular number of years of driving experience, does not have more than a particular number of moving violations while driving, has not been in more than a particular number of accidents involving driving, has acceptable vision, etc. Credentials of the potential operator may generally be checked.

A determination is made in a step 813 as to whether the potential operator has effectively passed the vetting process. That is, it is determined if the potential operator substantially meets minimum requirements associated with a distributed teleoperations platform. If the determination is that the potential operator has not passed the vetting process, the potential operator may take steps towards successful vetting in a step 817. In other words, the potential operator may take action to address deficiencies, and may attempt another vetting process in step 809.

Alternatively, if it is determined in step 813 that the potential operator has passed the vetting process, then process flow proceeds to a step 821 in which the potential operator obtains teleoperations equipment, In one embodiment, the potential operator may lease or purchase the teleoperations equipment from an enterprise associated with the distributed teleoperations platform, and have the teleoperations equipment set up at his or her residence, or at another location associated with the potential operator. It should be appreciated that the potential operator may instead utilize teleoperations equipment that is substantially set up at another location, e.g., at a training location.

Once the potential operator obtains teleoperations equipment, e.g., teleoperations equipment 400' of FIG. 5, the teleoperations equipment is calibrated and certified in a step 825. The calibration and certification are performed to ensure that the teleoperations equipment is in operating condition, and generally includes ensuring that the site at which the teleoperations equipment is located has adequate network bandwidth. Such calibration and certification may be performed by the potential operator, or by a technician dispatched by the distributed teleoperations platform.

After the teleoperations equipment is calibrated and certified, the potential operator participates in training 829. The training may entail, but is not limited to entailing, teaching the potential operator about the different components in the teleoperations equipment, simulating driving using the teleoperations equipment, etc. A driving simulation may present the potential operator with real-life situations, e.g., driving on a windy road and driving in relatively heavy traffic, and effectively allow the potential operator to practice driving in a simulated environment.

In a step 833, the potential operator undergoes a testing and qualification assessment. Generally, the testing and qualification assessment may involve determining how the potential operator reacts to different simulated driving situations, substantially quantifying how well the potential operator drives in the different simulated driving situations, and identifying driving situations that the potential operator is qualified to drive.

It is determined in step 837 whether the potential operator has passed the testing and qualification assessment. Such a determination may be made through the distributed teleoperations platform, e.g., by administrators associated with the distributed teleoperations platform. For example, an administrator may observe the testing and qualification assessment. In one embodiment, determining whether the potential operator has passed the testing and qualification assessment may include a substantially automatic assessment, e.g., the testing and qualification assessment itself may analyze the performance of the potential operator to determine whether the potential operator has reached a threshold for passing.

If the determination is that the potential operator has not passed the testing and qualification assessment, process flow returns to step 829 in which the potential operator participates in training, e.g., additional training to address his/or her deficiencies. Such training may be general or may be substantially targeted, and may address deficiencies identified during the testing and qualification assessment.

Alternatively, if it is determined in step 837 that the potential operator has passed the testing and qualification assessment, the potential operator is subjected to a background check in a step 841. A background check generally includes determining whether the potential operator is who he or she purports to be, and may include, but is not limited to including, checking an employment history of the potential operator, checking an education history of the potential operator, and/or checking the criminal record of the potential operator. It should be appreciated that if the potential operator passes the background check, the potential operator is effectively certified as a teleoperator who may utilize teleoperations equipment associated with the distributed teleoperations platform. Upon the completion of a background check, the method of certifying a potential operator to be a teleoperator is completed.

A certified teleoperator may requests shifts or time slots during which he or she may control and/or monitor a vehicle such that he or she may take control of the vehicle as needed. For example, when the certified teleoperator has some free time, he or she may decide to log into a distributed teleoperations platform to request an opportunity to drive a vehicle and, thus, to earn income. The certified teleoperator may be substantially anywhere, and may take control of a vehicle that may generally also be substantially anywhere. For example, a certified teleoperator may be located in one city or state, and a vehicle that he or she may control may be in a different city or state.

Figure 9:
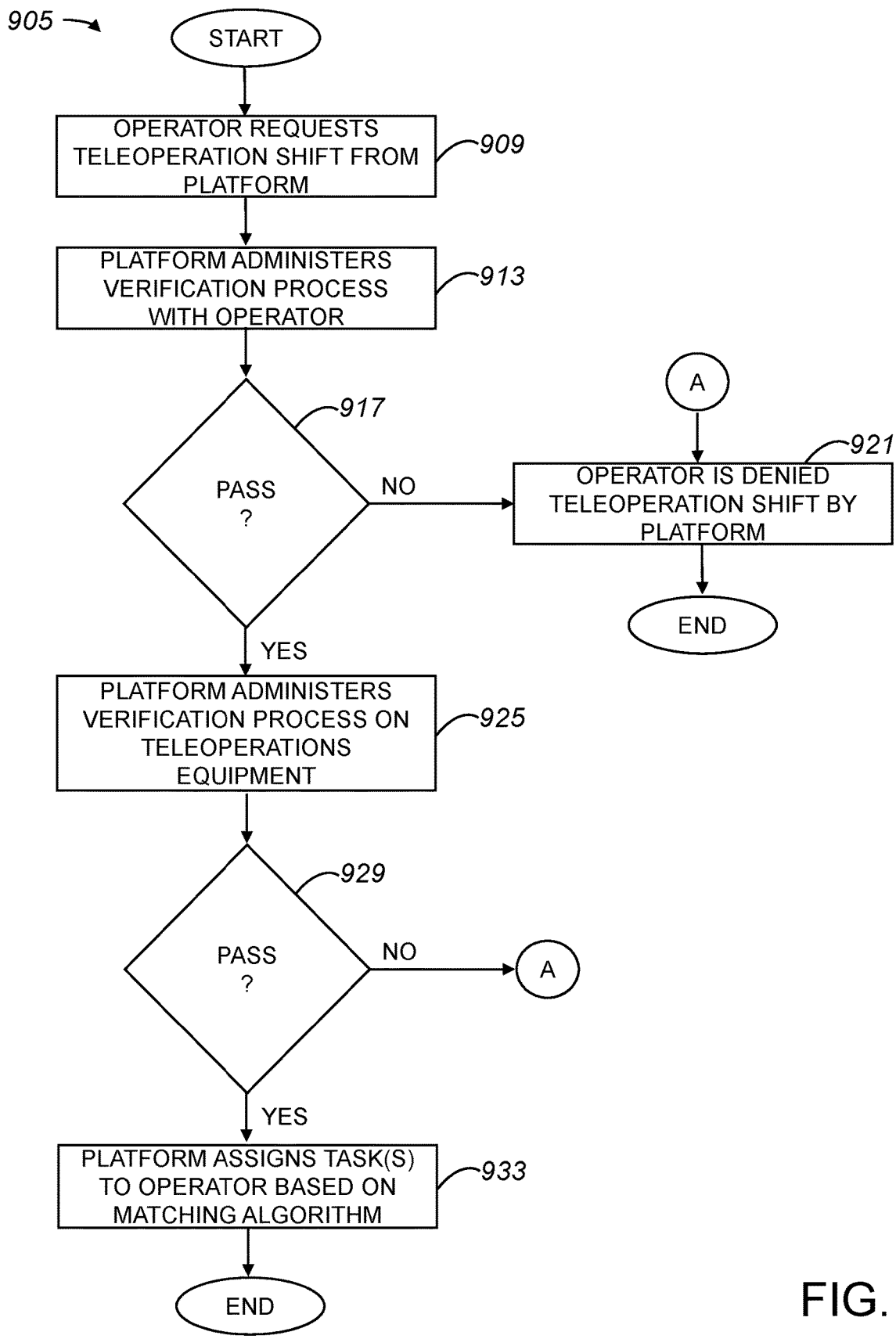
FIG. 9 is a process flow diagram which illustrates a method of processing a request by a certified teleoperator for a teleoperation shift in accordance with an embodiment.

FIG. 9 is a process flow diagram which illustrates a method of processing a request by a certified teleoperator for a teleoperation shift in accordance with an embodiment. A method 905 of processing a request by a certified teleoperator for a teleoperation shift begins at a step 909 in which the certified teleoperator, e.g., an operator, requests a teleoperation shift from a distributed teleoperations platform. The teleoperation shift may generally be a shift during which the operator controls or is available to intervene to take control of a vehicle as needed. Such a request may be made, in one embodiment, when the operator logs into the platform and indicates that he or she is available to be scheduled for a teleoperation shift. It should be appreciated that security protocols may be set to ensure that the logic process is secure, e.g., processes may include password authentication and encryption.

The platform administers a verification process with the operator in a step 913. The verification process generally involves determining whether the operator is who he or she is purported to be, determining whether the operator appears to be in condition to control a vehicle, determining whether there are any adverse indicators recorded with respect to the operator which would effectively render the operator unable to be scheduled for a teleoperation shift, etc. The verification may include, but is not limited to including, the use of fingerprint matching, facial recognition, IP address matching, and artificial intelligence. The verification may also include checking public records associated with the operator, for example, to determine if the operator has had any recent issues relating to driving actual vehicles.

From step 913, process flow moves to a step 917 in which it is determined if the operator has passed the verification process. If it is determined that the operator has not passed the verification process, the operator is denied a teleoperation shift by the platform in a step 921, and the method of processing a request for a teleoperation shift is terminated.

Alternatively, if it is determined in step 917 that the operator has passed the verification process, the indication is that the operator is qualified to be assigned a teleoperation shift if his or her teleoperations equipment meets standards. Accordingly, in a step 925, the platform administers a verification process on the teleoperations equipment. Such a verification process may include, but is not limited to including, testing the connection speed of the network to which the teleoperations equipment is connected, assessing latency associated with signals transmitted and received by the teleoperations equipment, and/or running diagnostics to assess whether the components of the teleoperations equipment are in working order. In general, the verification process may involve ascertaining whether the teleoperations equipment meets a predetermined performance standard.

A determination is made in a step 929 as to whether the teleoperations equipment has passed the verification process. If it is determined that the teleoperations equipment has not passed the verification process, process flow proceeds to step 921 in which the operator is denied a teleoperation shift, and the method of processing a request for a teleoperation shift is terminated.

If, on the other hand, the teleoperations equipment is determined to pass the verification process in step 925, then the platform may assign at least one task to the operator based on a matching algorithm in a step 933. The matching algorithm may match the operator to a specific task based on factors including, but not limited to including, the qualifications of the operator, the availability of the operator, the amount of training the operator has had, the location of the operator, the experience the operator has with a path to be traversed as part of the task, the latency associated with the network used by the operator, and the connection speed of the teleoperations equipment used by the operator. Once the one or more tasks are assigned to the operator, the method of processing a request for a teleoperation shift is completed.

When an operator has an assigned teleoperation shift, the operator and his/or her teleoperations equipment may be monitored to ensure that the operator is alert and capable, and to ensure that the teleoperations equipment is in working order. Such monitoring ensures, for example, that a vehicle operated by and/or monitored by the operator may drive safely. In addition, monitoring may be performed to ensure that the operator who has been assigned a teleoperation shift is the individual who is using teleoperations equipment.

In order to keep an operator or individual from becoming distracted during a teleoperation shift, the individual may be monitored during his or her teleoperation shift. Monitoring may include, but is not limited to including, determining whether the eyes of the individual are substantially focused on a screen of the teleoperations equipment, determining when the eyes of an individual are closed, and/or sending a message or providing a notification to the individual using the teleoperations equipment that the individual is to acknowledge to substantially show that he or she is alert. If there is an indication that the operator is distracted, the operator may be notified that his or her teleoperation shift is about to be terminated. When an alternate operator is ready to begin monitoring the vehicle that is being monitored by a distracted operator, the alternate operator may be given a teleoperation shift to monitor the vehicle at substantially the same time that the teleoperation shift of the distracted operator is terminated.

Figure 10:
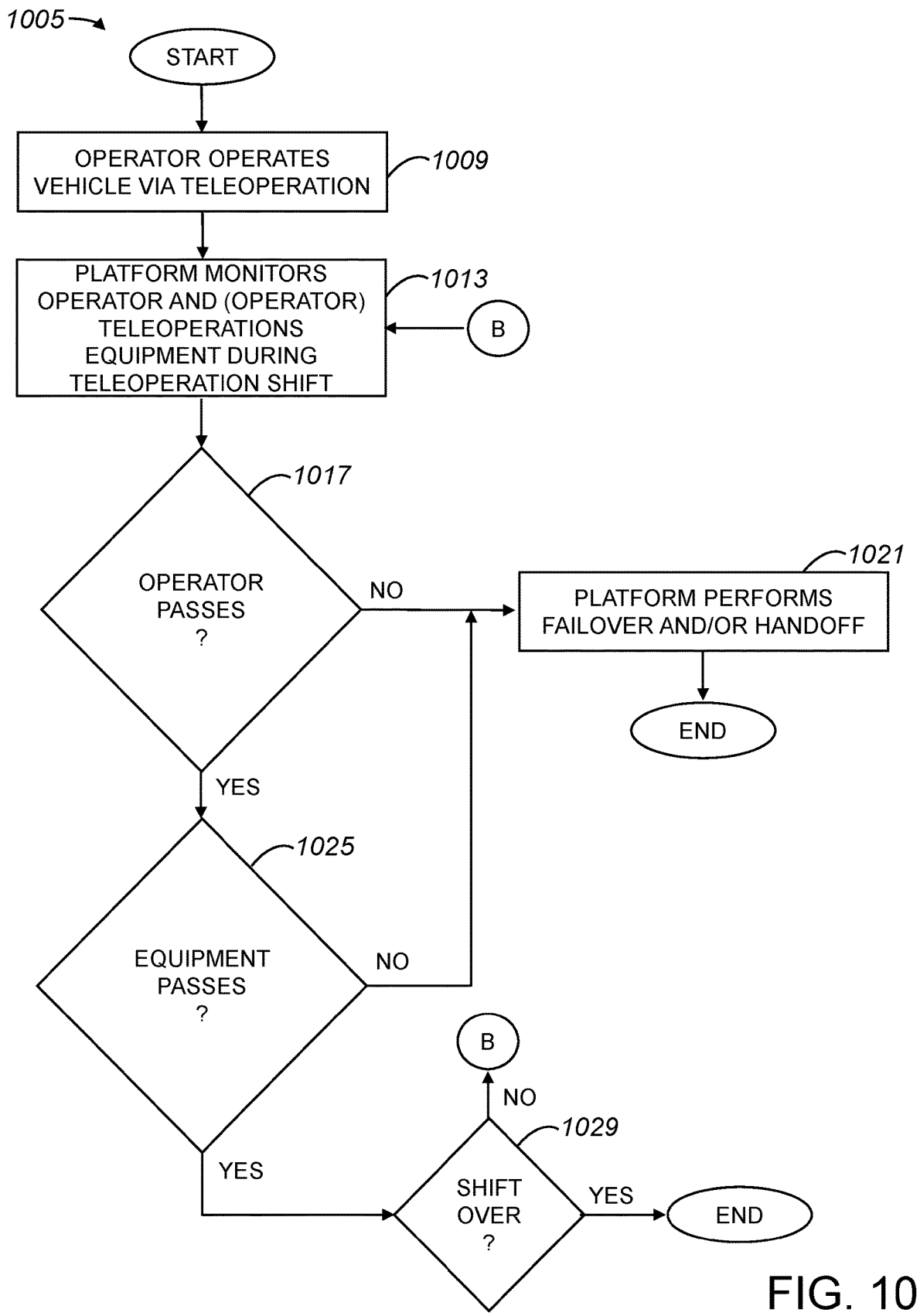
FIG. 10 is a process flow diagram which illustrates a method of assessing a teleoperation shift from the point-of-view of a platform management system in accordance with an embodiment.

FIG. 10 is a process flow diagram which illustrates a method of assessing a teleoperation shift from the point-of-view of a platform management system that is part of a distributed teleoperation platform in accordance with an embodiment. A method 1005 of assessing a teleoperation shift begins at a step 1009 in which an operator operates or controls a vehicle via teleoperation, using teleoperations equipment such as teleoperations equipment 400' of FIG. 5. Although control of a vehicle is described, it should be understood that an operator is not limited to controlling a vehicle. For example, an operator may control substantially any suitable device via teleoperation.

In a step 1013, the platform or, more specifically, the platform management system monitors the operator and the teleoperations equipment. Such monitoring may be performed, for example, using cameras associated with the teleoperations equipment, and may include continuous facial recognition monitoring. It should be appreciated that artificial intelligence models may be used to identify anomalous operator behavior. When anomalous operator behavior is identified, the operator may be deemed not to be functioning at an acceptable level. The teleoperations equipment may be monitored to determine if there is degradation in performance, e.g., the connection speed associated with the teleoperations equipment may be monitored to determine if the speed is adequate.

A determination is made in a step 1017 as to whether the operator passes, or is continuing to perform at an acceptable level. If it is determined that the operator does not pass, the indication is that the platform has determined that it is likely unsafe, or at least not prudent, to allow the operator to continue operating or monitoring the vehicle. Hence, if it is determined that the operator should not continue utilizing teleoperations equipment during the teleoperation shift, the platform performs a failover and/or a handoff in a step 1021. As will be appreciated by those skilled in the art, a failover and/or a handover may involve the platform identifying an alternate teleoperator to effectively take over operating or monitoring the vehicle that was being operated by the operator. After the platform performs a failover and/or a handoff, the method of assessing a teleoperation shift is completed.

Alternatively, if it is determined that the operator passes in step 1017, then it is determined in a step 1025 whether the teleoperations equipment passes, or is operable at an acceptable level. If it is determined that the teleoperations equipment does not pass, then the platform performs a failover and/or handoff in step 1021, and the method of assessing a teleoperation shift is completed.

If, on the other hand, it is determined that the equipment passes in step 1025, then it is determined in a step 1029 whether the teleoperation shift is over. If the determination is that the teleoperation shift is not over, process flow returns to step 1013 in which the platform monitors the operator and the teleoperations equipment as the teleoperation shift continues.

While a particular teleoperations system is used to monitor and/or control a vehicle during an assignment or shift, the particular teleoperations system may be determined to be inadequate for continuing to monitor and/or control the vehicle. As a result, within an overall distributed teleoperations platform, a different teleoperations system may effectively take over the assignment or shift from the particular teleoperations system.

Figure 11A:
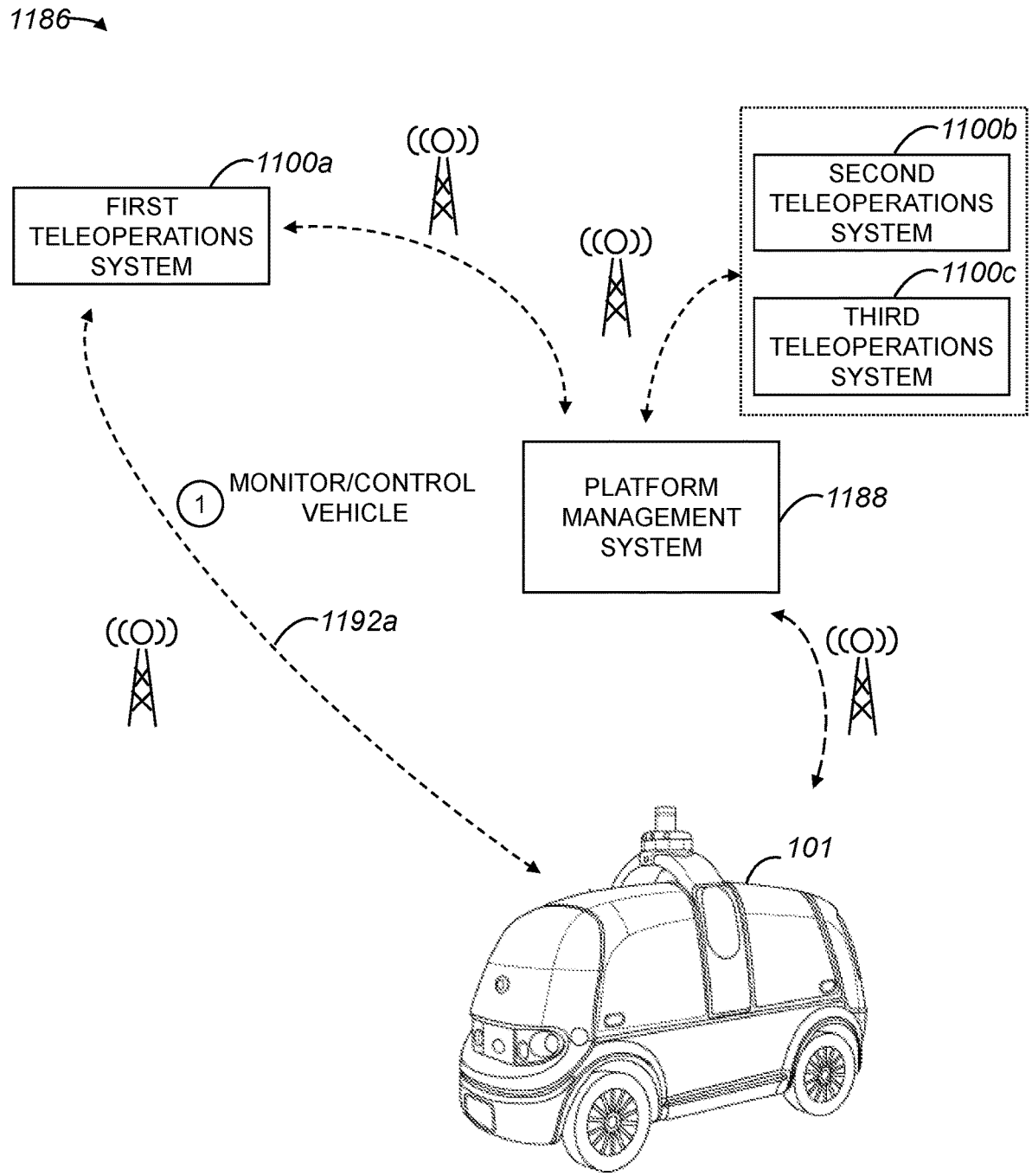
FIG. 11A is a diagrammatic representation of an overall distributed teleoperations platform which includes a vehicle, e.g., vehicle 101 of FIG. 2, at a time t1 when a first teleoperations system is in use in accordance with an embodiment.

Referring next to FIGS. 11A-E, the operation of an overall distributed teleoperations platform when there is a need to effectively replace one teleoperations system with another during a shift will be described in accordance with an embodiment. FIG. 11A is a diagrammatic representation of an overall distributed teleoperations platform which includes a vehicle, e.g., vehicle 101 of FIG. 2, at a time t1 when a first teleoperations system is in use in accordance with an embodiment. At a time t1, a first teleoperations system 1100a of a distributed teleoperations platform 1186 monitors and/or controls vehicle 101. A communications link 1192a is used between first teleoperations system 1110a and vehicle 101. Communications link 1192a may be, but is not limited to being, a wireless network link that supports LTE communications, 3G/4G/5G communications, Wi-Fi communications, and/or Bluetooth communications.

A platform management system 1188 monitors first teleoperations system 1100a and vehicle 101. In addition, platform management system 1188 monitors other teleoperations systems 1100b, 1100c which are available to be assigned to monitor and/or control vehicle 101 as needed. It should be appreciated that, in one embodiment, teleoperations systems 1100b, 1100c may be able to communicate with vehicle 101 using a wireless link. However, in general, such a link may not be present or effectively established unless a teleoperations systems 1100b, 1100c subsequently takes control of monitoring vehicle 101. Platform management system 1188 may generally evaluate whether first teleoperations system 1100a is able to monitor and/or control vehicle 101, and may also verify that teleoperations systems 1100b, 1100c are able to assume monitoring and/or control of vehicle 101.

Figure 11B:
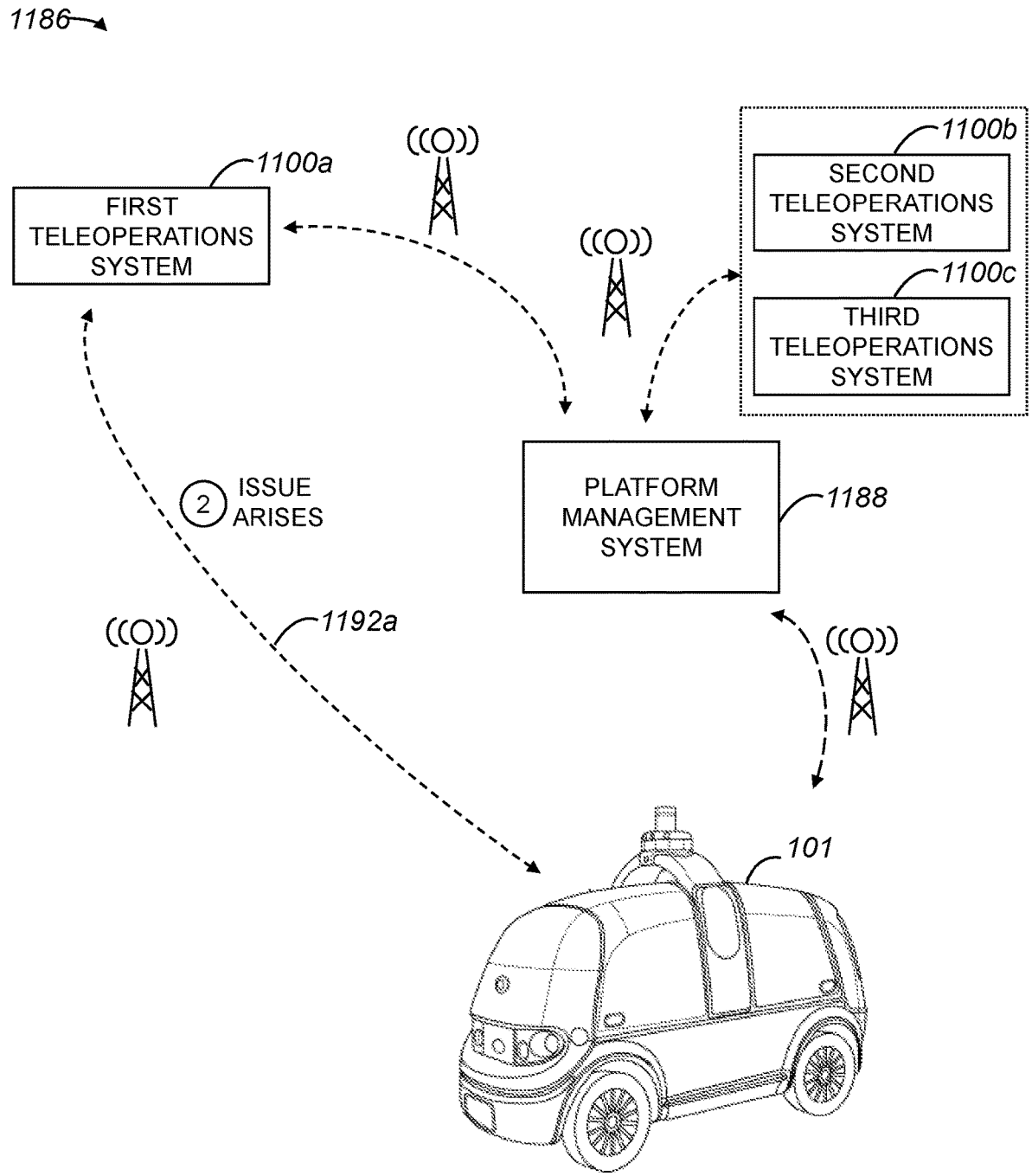
FIG. 11B is a diagrammatic representation of an overall distributed teleoperations platform, e.g., platform 1186 of FIG. 11A, at a time t2 when an issue arises with a first teleoperations system in accordance with an embodiment.

At a time t2, as shown in FIG. 11B, an issue arises with the ability of first teleoperations system 1100a to monitor and/or control vehicle 101. The issue may be detected by first teleoperations system 1100a, by vehicle 101, and/or by platform management system 1188. The issue may generally be any event or situation which compromises the ability for first teleoperations system 1100a to safely monitor and/or control vehicle 101. For example, the issue may involve a degradation in performance associated with communications link 1192a. The degradation in performance may include, but is not limited to including, latency issues and/or bandwidth issues.

Figure 11C:
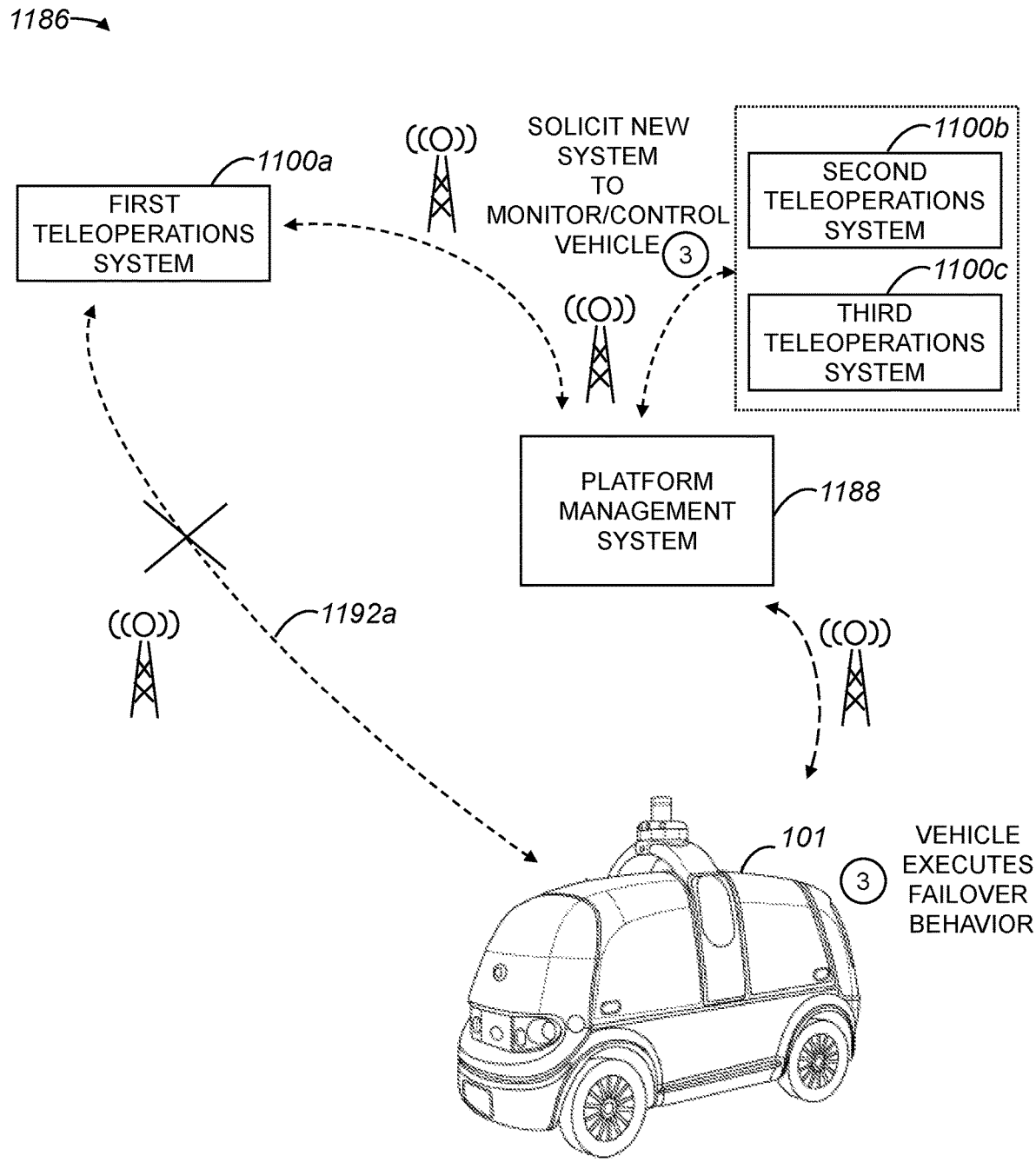
FIG. 11C is a diagrammatic representation of an overall distributed teleoperations platform, e.g., platform 1186 of FIG. 11A, at a time t3 when a new teleoperations system is to be identified for use in accordance with an embodiment.

After the issue arises, then vehicle 101 may execute a failover behavior until another teleoperations system 1100b, 1100c may effectively take over for first teleoperations system 1100a. FIG. 11C shows distributed teleoperations platform 1186 at a time t3 when vehicle 101 executes a failover behavior, and platform management system effectively solicits a new teleoperations system 1100b, 1100c to take over control and/or monitoring of vehicle 101. At time t3, vehicle 101 executes a failover behavior, as vehicle 101 is no longer being monitored or controlled by first teleoperations system 1100a. A failover behavior may include, but is not limited to including, the vehicle 101 identifying a safe location to pull over and autonomously driving to the safe location, pulling over, and coming to a stop. In general, platform management system 1188 may verify that vehicle 101 has executed failover behavior. In one embodiment, platform management system 1188 may cause the vehicle to execute failover behavior, e.g., by providing an instruction to vehicle 101 that failover behavior is to be executed, in the event that platform management system 1188 is unable to verify that vehicle has already executed failover behavior.

Also at time t3, platform management system 1188 solicits at least one available teleoperations system 1100b, 1100c to monitor and/or control vehicle 101. Platform management system 1188 may notify available teleoperations systems 1100b, 1100c of the availability of an assignment of shift to monitor and/or control vehicle 101 through any suitable method, e.g., by sending a message to teleoperations systems 1100b, 1100c. In one embodiment, platform management system 1188 may determine priorities associated with teleoperations system 1100b, 1100c, and may first notify substantially only second teleoperations system 1100b if second teleoperations system 1100b is determined to have a higher priority than third teleoperations system 1100c. In another embodiment, teleoperations systems 1100b, 1100c may be notified of an available shift at substantially the same time such that whichever teleoperations system 1100b, 1100b accepts the shift first may be assigned the shift.

Figure 11D:
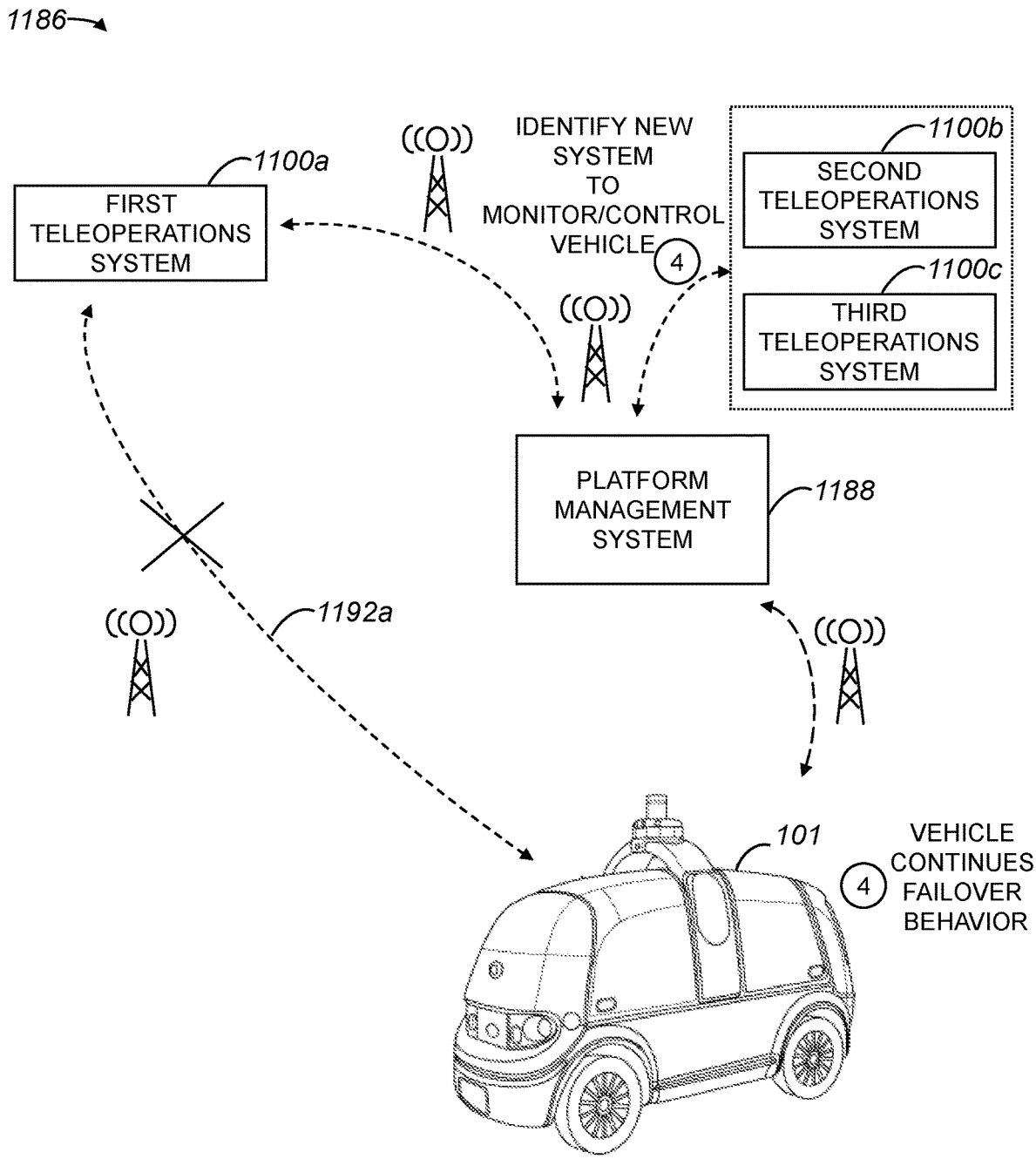
FIG. 11D is a diagrammatic representation of an overall distributed teleoperations platform, e.g., platform 1186 of FIG. 11A, at a time t4 when a new teleoperations system is identified in accordance with an embodiment.

FIG. 11D is a representation of overall distributed teleoperations platform 1186 at a time t4 when a teleoperations system 1100b, 1100c that is to take over control of vehicle 101 is identified. At time t4, vehicle 101 continues failover behavior, e.g., remains stopped, and platform management system 1188 determine whether any teleoperations systems 1100b, 1100c have responded to the availability of an assignment to take over monitoring and/or controlling vehicle 101. In the described embodiment, second teleoperations system 1100b is identified as having accepted a shift to monitor and/or control vehicle 101.

Figure 11E:
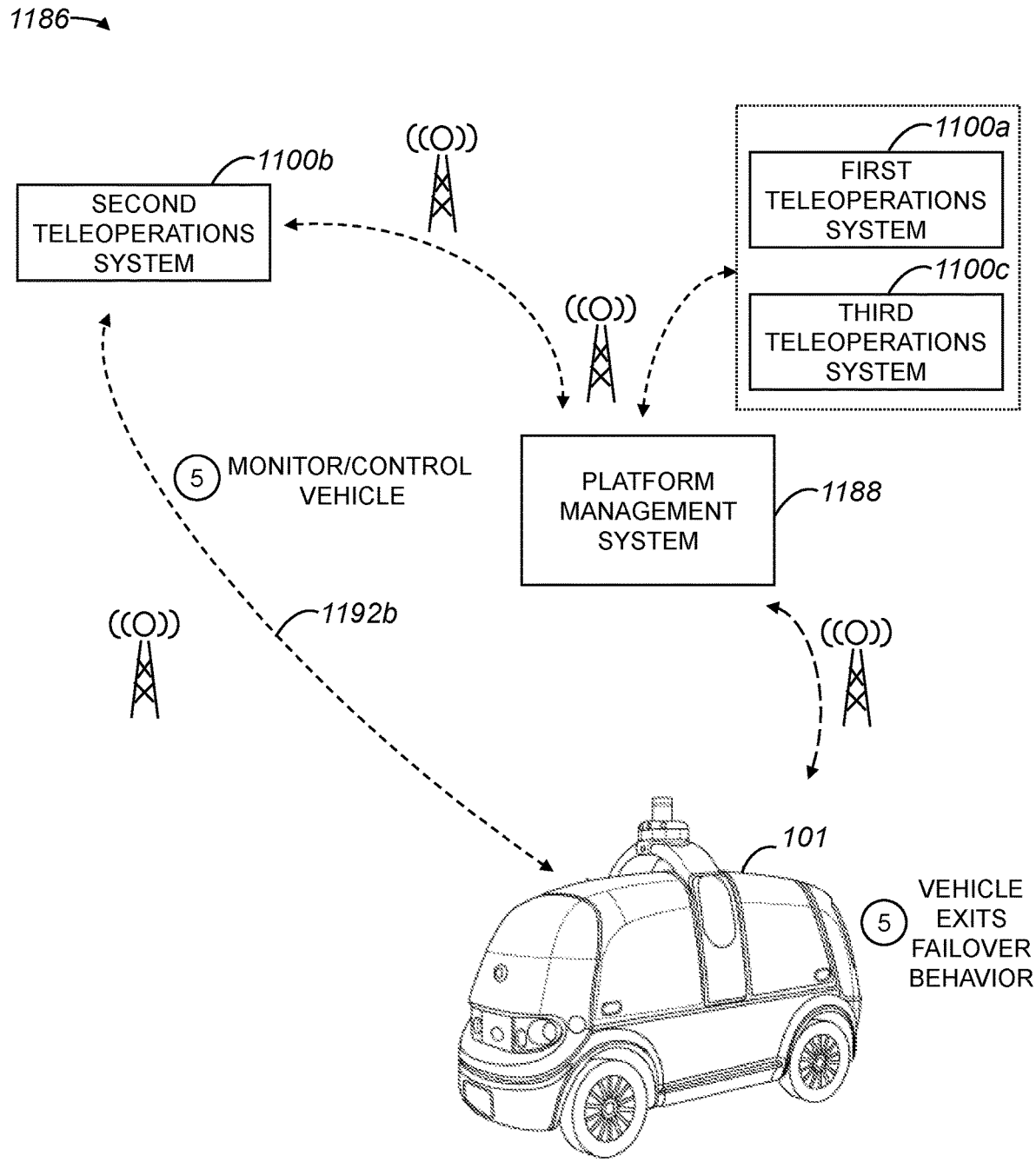
FIG. 11E is a diagrammatic representation of an overall distributed teleoperations platform, e.g., platform 1186 of FIG. 11A, at a time t5 when a second teleoperations system is in use in accordance with an embodiment.

At a time t5, as shown in FIG. 11E, second teleoperations system 1100b monitors and/or controls vehicle 101, and vehicle 101 exits failover behavior. Second teleoperations system 1100b communicates with vehicle 101 using a communications link 1192b. Also at time t5, first teleoperations system 1100a and third teleoperations system 1100c may be monitored by platform management system 1188, which also monitors second teleoperations system 1100b and vehicle 101.

Figure 12A:
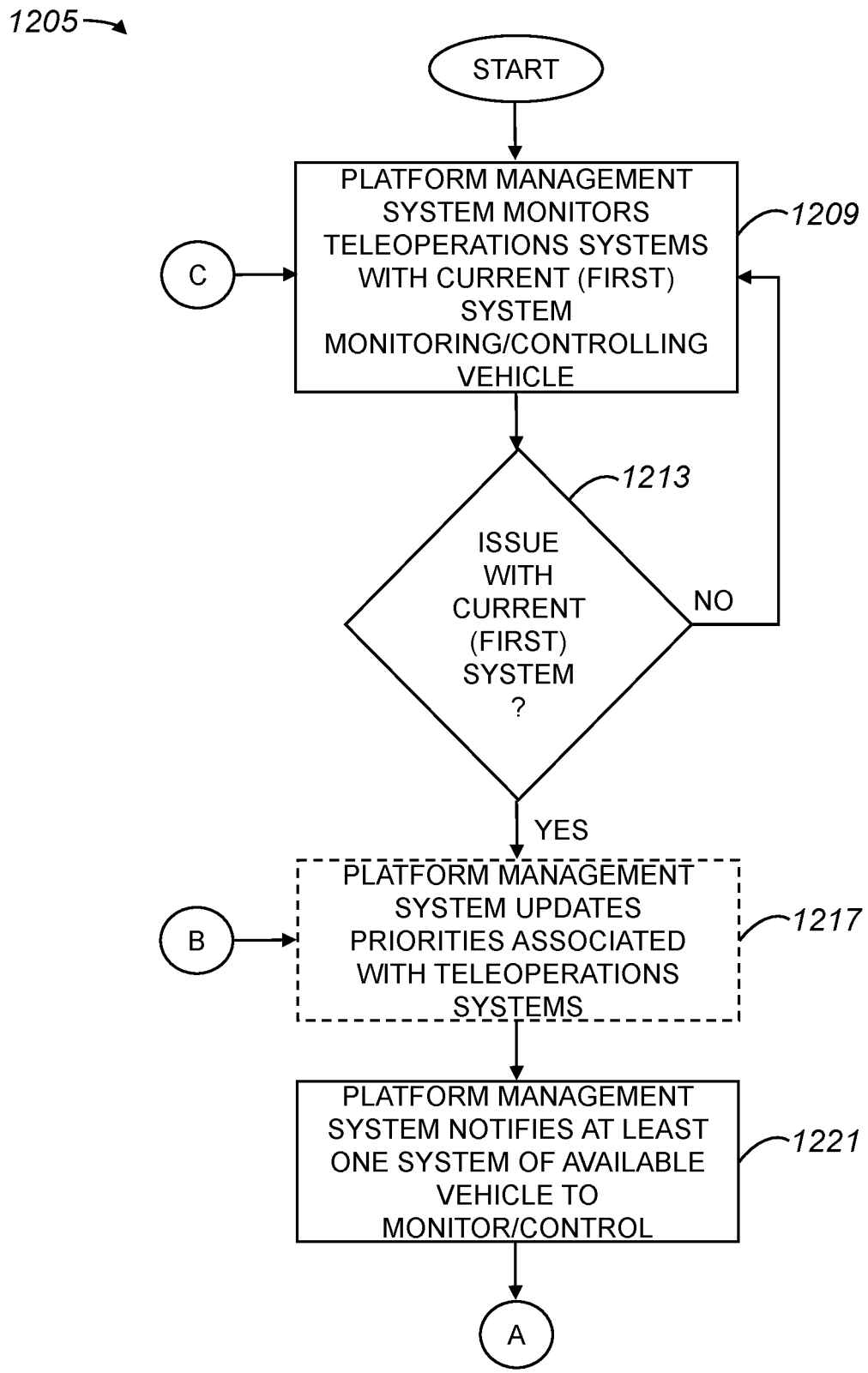
FIGS. 12A and 12B are a process flow diagram which illustrates a method of switching teleoperations systems which are responsible for monitoring and/or controlling a vehicle within an overall distributed teleoperations platform in accordance with an embodiment.
Figure 12B:
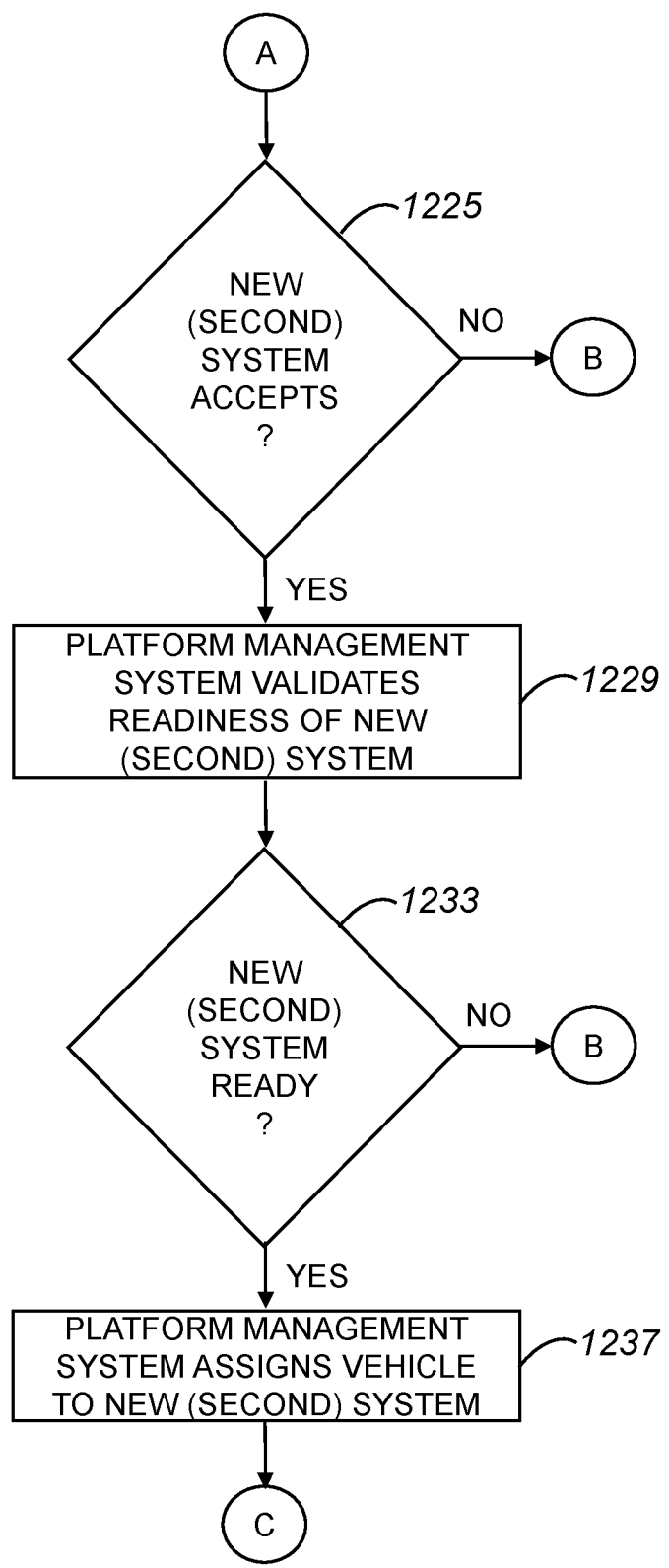

FIGS. 12A and 12B are a process flow diagram which illustrates a method of switching teleoperations systems which are responsible for monitoring and/or controlling a vehicle within an overall distributed teleoperations platform in accordance with an embodiment. A method 1205 of switching teleoperations systems which are responsible for monitoring and/or controlling a vehicle within an overall distributed teleoperations platform begins at a step 1209 in which a platform management system monitors teleoperations systems within the overall distributed teleoperations platform. The teleoperations systems monitored include a current system, e.g., a first system, that is monitoring and/or controlling a particular vehicle, as well as any teleoperations systems which are effectively available for assignment to any vehicle.

In a step 1213, a determination is made by the platform management system as to whether there is an issue with the current system, e.g., the first system. That is, it is determined whether there is a problem with the current system that may compromise the ability for the current system to be used to control the vehicle. It should be appreciated that the issue with the current system may be an issue with the current system itself, or an issue with an operator associated with the current system. In one embodiment, the issue may be a violation in a service level agreement associated with the current system, e.g., the current system may no longer be able to meet a specified service level. In general, determining whether there is an issue with the current system includes ascertaining whether a teleoperations system and/or an operator are functioning at an acceptable level.

If the determination in step 1213 is that there is no issue with the current system, the process flow returns to step 1209 in which the platform management system continues monitoring teleoperations system including the current system. Alternatively, if the determination is that there is an issue with the current system, the platform management system may update priorities associated with the teleoperations systems in an optional step 1217. Updating priorities may include, but is not limited to including, substantially updating an order of preference for teleoperations systems to take over monitoring and/or controlling the vehicle. Priorities may be based on any suitable factors including, but not limited to including, performance factors relating to operators and/or performance factors relating to the teleoperations systems. For example, a teleoperations system with a relatively low latency may be prioritized over a teleoperations system with a relatively high latency.

From step 1213 or from optional step 1217, process flow moves to a step 1221 in which the platform management system notifies at least one system of the availability of the vehicle to be monitored and/or controlled. The number of systems notified may vary depending upon the number of teleoperations systems that are available and/or meet particular criteria, e.g., performance criteria. In one embodiment, a single preferred system may be notified.

Once at least one system is notified, it is determined whether a new system, e.g., second system, has accepted an assignment to monitor and/or control the vehicle in a step 1225. If a new system has not accepted the assignment to monitor and/or control the vehicle, process flow returns to optional step 1217 in which priorities are updated.

Alternatively, if the determination in step 1225 is that a new system has accepted the assignment to monitor and/or control the vehicle, then in a step 1229, the platform management system validates the readiness of the new system, e.g., second system. Validating the new system may include, but is not limited to including, checking to determine if an operator is able to monitor and/or control the vehicle, checking to determine if the new system is operating at an acceptable level, and/or checking to determine if network connectivity associated with the new system is adequate.

In a step 1233, it is determined whether the new system is ready to be assigned to the vehicle. If the determination is that the new system is not ready to be assigned to the vehicle, the indication may be that the new system may not be validated. As such, it may be necessary to select a different system to assign to the vehicle. Accordingly, process flow returns to step optional step 1217 in which priorities are updated.

On the other hand, if the new system is determined to be ready for assignment in step 1233, then the platform management system assigns the vehicle to the new system in a step 1237. Assigning the vehicle to the new system generally includes enabling the new system to monitor and/or control the vehicle, and may include cancelling or substantially overriding the assignment of the vehicle to the previous system, e.g., a first system to which the vehicle was assigned. In one embodiment, assigning the vehicle to the new system may include effectively starting a second shift that encompasses the initial shift associated with the first system. After the vehicle is assigned to the new system, process flow returns to step 1209 in which the platform management system monitors teleoperations system with the current system, e.g., second system, monitoring and/or controlling the vehicle.

Figure 13:
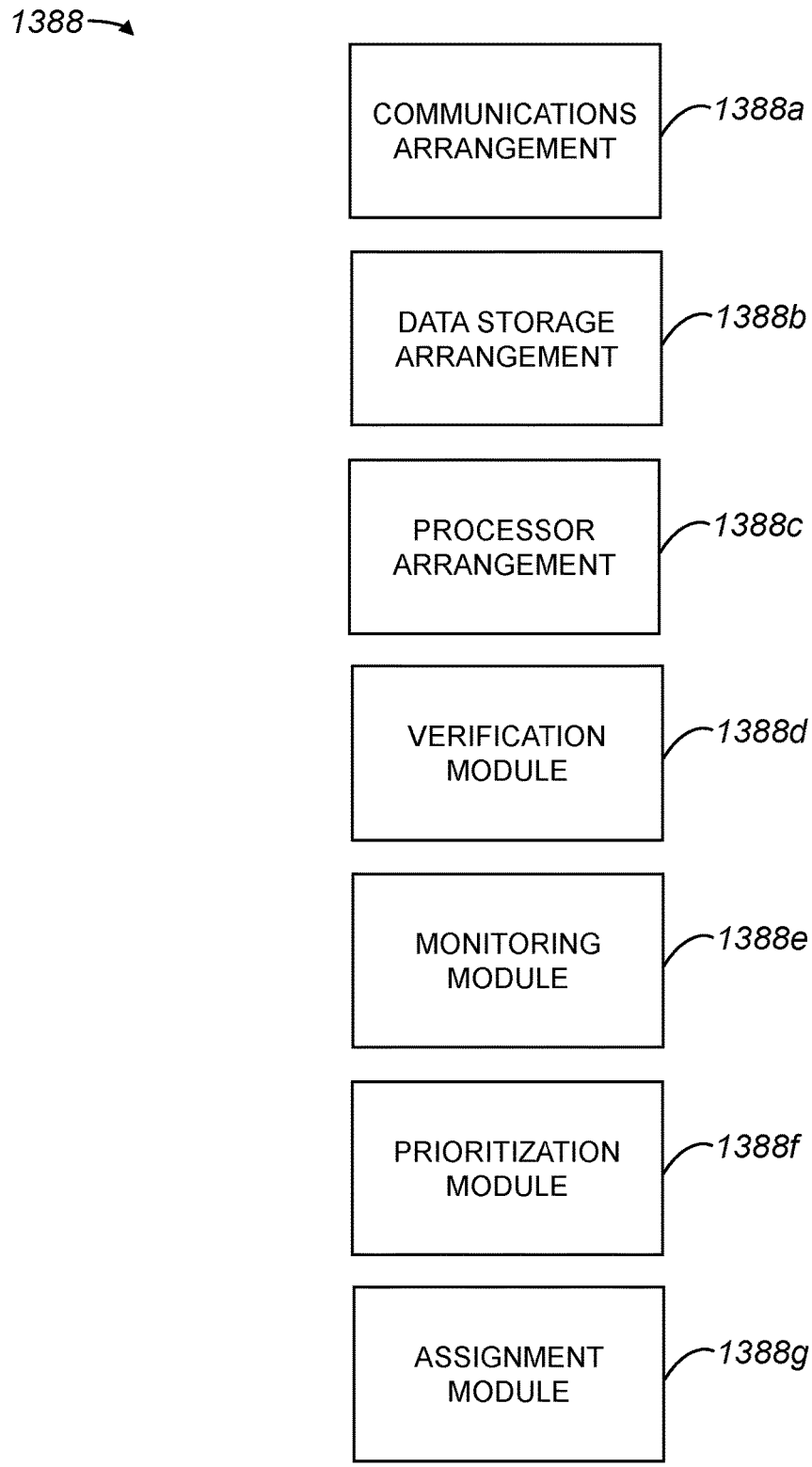
FIG. 13 is a block diagram representation of a platform management system in accordance with an embodiment.

FIG. 13 is a block diagram representation of a platform management system in accordance with an embodiment. A platform management system 1388 is generally part of an overall distributed teleoperations platform, and may effectively manage teleoperations systems and vehicles and/or other devices that are arranged to be monitored and/or controlled by teleoperations systems. Platform management system 1388 includes a communications arrangement 1388a, a data store arrangement 1388b, a processor arrangement 1388c, a verification module 1388d, a monitoring module 1388e, a prioritization module 1388f, and an assignment module 1388g.

Communications arrangement 1388a may be arranged to communicate over one or more networks with teleoperations systems and vehicles. Communications arrangement 1388a may include ports which support providing and obtaining data using any suitable type of communications including, but not limited to including, wireless communications such as Wi-Fi communications, LTE communications, Bluetooth communications, and/or 3G/4G/5G communications.

Data storage arrangement 1388b may include a database and/or memory configured to store data pertaining to the overall distributed teleoperations platform. For example, data storage arrangement 1388b may store information relating to operators of teleoperations systems, information relating to teleoperations systems, information relating to vehicles, etc. It should be appreciated that in some embodiment, communications arrangement 1388a may be used to access information that in not available in data storage arrangement 1388b.

Processor arrangement 1388c may include one or more processors which are configured to execute code devices associated with verification module 1388d, monitoring module 1388e, prioritization module 1388f, and assignment module 1388g. In one embodiment, processor arrangement 1388c may include a central processing unit.

Verification module 1388d may include hardware and/or software logic which, in cooperation with processor arrangement 1388c, may enable an operator to be authenticated or otherwise verified. For example, verification module 1388b may obtain data from an operator, and may compare that data to information stored in data storage arrangement 1388b to ascertain whether the operator is who he or she purports to be. Verification module 1388b may administer tests to determine whether an operator is in a state or condition in which the operator may safely monitor a vehicle. Verification module 1388d may also verify when teleoperations systems are operating as expected and/or whether a network connection associated with a teleoperation system is sufficient, e.g., has acceptable connectivity and/or latency. In one embodiment, verification module 1388b may be configured to verify an Internet Protocol (IP) address associated with a teleoperations system to effectively verify that the IP address is trusted.

Monitoring module 1388e may include hardware and/or software logic which, in cooperation with processor arrangement 1388c, may monitor teleoperations systems and vehicles. Monitoring module 1388e may monitor teleoperations systems to identify when issues arise, e.g., when the latency associated with communications between a teleoperations system and a vehicle is higher than acceptable. Monitoring module 1388e may also monitor teleoperations systems which are awaiting assignment to monitor and/or control vehicles. In one embodiment, when monitoring module 1388e identifies an issue, monitoring module 1388e may cooperate with verification module 1388d to effectively re-verify whether an operator may safely monitor a vehicle and/or to effectively re-verify whether a teleoperations system is performing at a threshold or acceptable level.

Prioritization module 1388f may include hardware and/or software logic which, in cooperation with processor arrangement 1388c, enables teleoperations systems to be prioritized with respect to assignments to monitor and/or control vehicles. Prioritization module 1388f may account for various factors when substantially generating priorities associated with teleoperations systems. The various factors may generally relate to performance criteria. Factors used to substantially generate priorities may include, but are not limited to including, the acumen of an operator of a teleoperations system to drive particular routes, the amount of network bandwidth available for a teleoperations system, the latency associated with a teleoperations system, a geographical location of a teleoperations system, an amount of time an operator of a teleoperations system may be available during a shift, etc. In one embodiment, wage rates and/or seniority statuses of operator of teleoperations systems may be considered when generating priorities.

Assignment module 1388g may include hardware and/or software logic which, in cooperation with processor arrangement 1388c, may assign a particular teleoperations system and, hence, an operator, to monitor and/or control a vehicle. The assignment of a particular teleoperations system may include, but is not limited to including, cancelling a previous assignment of a teleoperations system to a vehicle and/or updating a list or set of available teleoperations systems to substantially reflect the assignment of the particular teleoperations system.

While a distributed teleoperations platform has been described as being suitable for use to allow vehicles to be driven by a teleoperator, it should be appreciated that a distributed teleoperations platform is not limited to being used to substantially drive vehicles. In general, a distributed teleoperations platform may be used to "drive," or to otherwise control the movement of, any suitable robotic device. That is, a distributed teleoperations platform may be arranged to enable remote teleoperators to monitor and/or to control any suitable robotic device. For example, a distributed teleoperations platform may be arranged to enable a remote teleoperator to monitor and/or to control a robotic device that is arranged to perform pick-and-place tasks in a retail store or in an assembly line.

Figure 14:
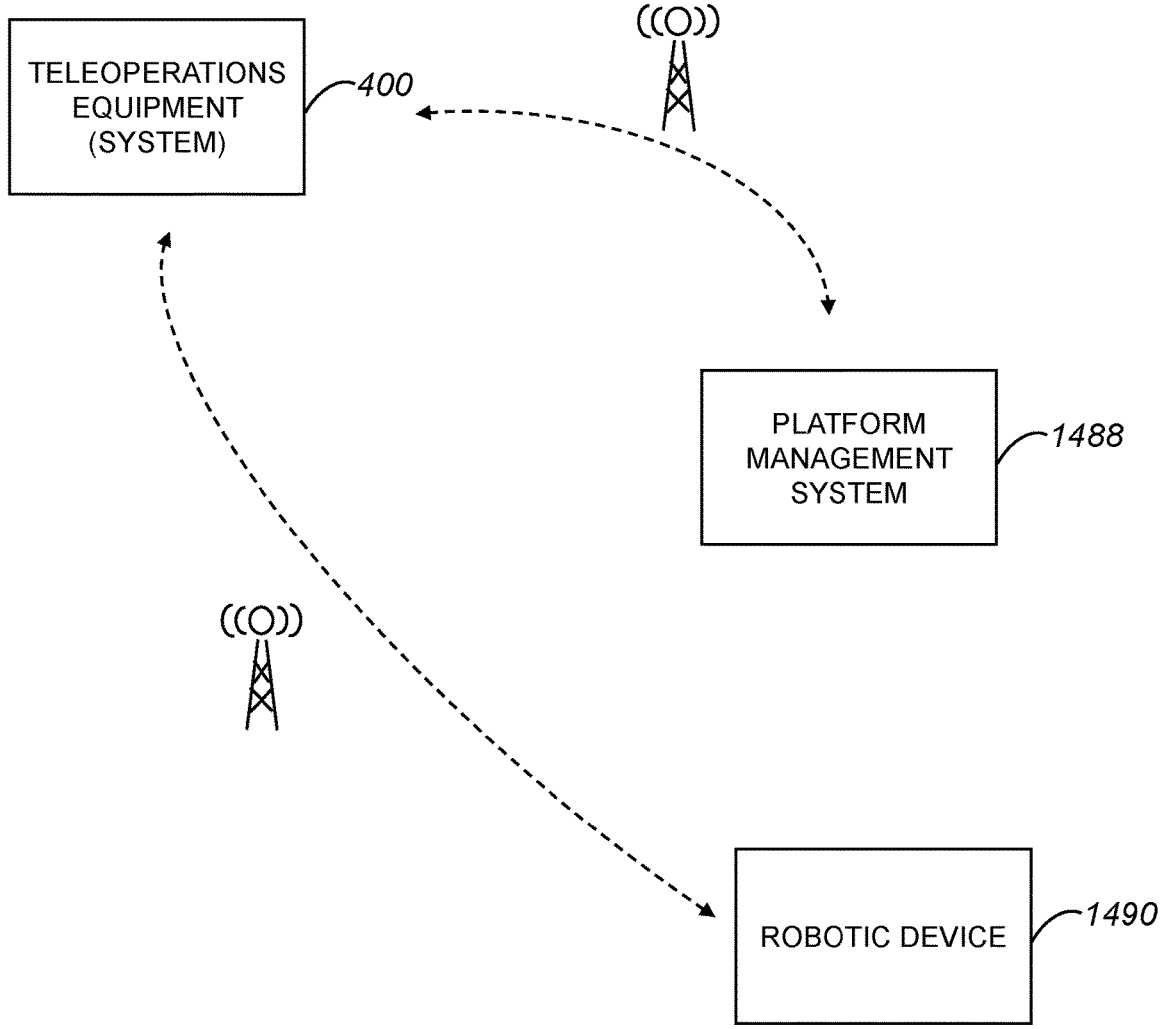
FIG. 14 is a diagrammatic representation of an overall distributed teleoperations platform which includes a robotic device in accordance with an embodiment.

FIG. 14 is a diagrammatic representation of an overall distributed teleoperations platform which includes a robotic device in accordance with an embodiment. A distributed teleoperations platform 1486 includes teleoperations equipment 400, a platform management system 1488, and a robotic device 1490. Teleoperations equipment 400 may be, in one embodiment, located at a home of a teleoperator or at any other suitable location.

Platform management system 1488, which is generally arranged to monitor teleoperations equipment 400 and teleoperators, as well as to manage assignments of teleoperators to devices, is in communication with teleoperations equipment 400 in a wireless manner. For example, platform management system 1488 and teleoperations equipment 400 may communicate using cellular networks, wireless networks, and/or 3G/4G/5G networks. It should be appreciated that platform management system 1488 may also, in some embodiments, be arranged to communicate substantially directly with robotic device 1490 in a wireless manner.

Robotic device 1490 may be any suitable robot or device that may be operated by teleoperations equipment 400. Robotic device 1490 may be, but is not limited to being, a robot that prepares food, a robot that assists with childcare, a robot that performs household chores, a robot that is performs work on an assembly line, etc. Typically, robotic device 1490 includes a camera or similar device which provides teleoperations equipment 400 with a view of the surroundings of robotic device 1490. Robotic device 1490 also generally includes a communications interface that enables teleoperations equipment 400 to communicate with robotic device 1490 to control the movement of robotic device 1490.

Although only a few embodiments have been described in this disclosure, it should be understood that the disclosure may be embodied in many other specific forms without departing from the spirit or the scope of the present disclosure. For example, teleoperations equipment may include any suitable components which allow a vehicle and/or a robotic device to be controlled. Components such as joysticks, touchscreen interfaces, keypads, keyboards, and the like may be included in lieu of a steering wheel and/or pedals. That is, the configuration of teleoperations equipment may vary widely.

In one embodiment, a certified operator or teleoperator may be routinely rated and scored to substantially ensure that the highest levels of service are provided by the distributed teleoperations platform. For instance, a teleoperator may be assessed during a teleoperation shift, or the teleoperator may be expected to be periodically tested for purposes of assessment and/or recertification. A teleoperator who does not meet a minimum level of competence, e.g., a teleoperator who does not pass a routine assessment, may be notified that he or she does not meet requirements, subject to a probationary period, expected to partake in additional training, and/or permanently removed from being eligible to be assigned a teleoperation shift by a distributed teleoperations platform.

To substantially ensure minimum viable connection speeds associated with teleoperations equipment, a distributed teleoperations platform may test for connection quality prior to login by a teleoperator, and provide substantially continuous monitoring while the teleoperations performs a task or is waiting to be dispatched to perform a task such as operating a vehicle or a robotic device. A deterioration in connection quality may provide an alert, as for example to the distributed teleoperations platform, the vehicle, and/or the robotic device, which indicates that preparations should be made for a failover and/or a handoff to another qualified teleoperator associated with the distributed teleoperations platform.

Further, to substantially ensure the working condition of teleoperations equipment, a teleoperator may conduct diagnostic tests prior to, or just after, he or she logs into the teleoperations equipment and/or a distributed teleoperations platform. The diagnostic tests may involve completing basic maneuvers in a simulated environment to substantially calibrate the teleoperations equipment. Once the teleoperations equipment is successfully calibrated, the teleoperator may effectively enter a queue to be assigned a task, e.g., a vehicle operation or robotic device operation task, and be dispatched to perform a task once the task is assigned.

As described above, a teleoperator may obtain teleoperations equipment such as a remote operation console from an enterprise associated with a distributed teleoperations platform. In general, a teleoperator may lease or purchase teleoperations equipment from a manufacture, an enterprise associated with the distributed teleoperations platform, or from an enterprise which owns or is otherwise responsible for vehicles that are to be operated by the teleoperator. During the course of a teleoperator utilizing teleoperations equipment, a verification may be performed to ascertain whether the teleoperator is authorized or certified to utilize the teleoperations equipment.

Teleoperations equipment may provide an indication, as for example to a teleoperator, of how the teleoperator may be able to improve his or her ability to receive priority assignments to monitor and/or control a vehicle. The indications may be arranged to provide information relating to how fast a current network connection is and/or a latency associated with the network connection.

In one embodiment, disruptions in network connections may be accounted for when scheduling teleoperators for shifts to monitor and/or control vehicles. For instance, if it is known ahead of time that latencies on cables with be compromised and that communications will be disrupted due to planned maintenance or a known issue, then any teleoperator who may need to use the cables to participate in a shift may be prevented from being assigned a shift that will be in progress during a known disruption.

When priorities associated with teleoperations systems and corresponding teleoperators are used to determine task assignments, it should be appreciated that the acceptable latencies associated with different tasks may be used in determining priorities. By way of example, if one driving assignment or task may sustain a higher latency than another driving assignment or task, then a teleoperations system with a higher latency may be assigned rather than a teleoperations system with a lower latency. As a result, the teleoperations system with the lower latency may be available for a different driving assignment or task, e.g., a driving assignment or task that may not be able to sustain a higher latency.

Verification software or a controls arrangement configured to verify a teleoperator and/or teleoperations equipment may execute on the teleoperations equipment. That is, verification software arranged to verify a teleoperator and/or teleoperations equipment generally runs on the teleoperations equipment that is in the possession of the teleoperator. In one embodiment, in order to ensure that the verification software is not being tampered with or has not been tampered with, the verification software may be arranged to execute in a secure enclave of the teleoperations equipment or, more generally, a central processing unit associated with the teleoperations equipment. When the verification software executes in a secure enclave, the verification software may be considered to be trusted even though the verification software executes on a device in the possession of a teleoperator, e.g., on a client device.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium or storage medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions. Instructions are generally embodied in the executable logic.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. For example, FIG. 8 describes a potential operator obtaining or otherwise procuring teleoperations equipment for use in completing a training course or regimen. In one embodiment, the potential operator may instead complete a training course using equipment at a training location, and then obtain teleoperations equipment only after he or she has successfully qualified to be a teleoperator. Therefore, the present examples are to be considered as illustrative and not restrictive, and the examples are not to be limited to the details given herein, but may be modified within the scope of the appended claims.

What is claimed is:

1. A method for operating a distributed teleoperations system, the method comprising:
   identifying a vehicle, the vehicle being arranged to be remotely monitored using teleoperations, wherein the vehicle is identified by a teleoperations platform;
   obtaining, on the teleoperations platform, a first request from a first teleoperations arrangement to remotely monitor the vehicle, the first teleoperations arrangement being remotely located from both the teleoperations platform and the vehicle;
   determining whether to accept the first request from the first teleoperations arrangement to remotely monitor the vehicle, wherein determining whether to accept the first request from the first teleoperations arrangement includes verifying that a first operator of the first teleoperations arrangement is certified and performing one or more assessments of the first teleoperations arrangement's hardware or software;
   in response to determining to accept the first request from the first teleoperations arrangement to remotely monitor the vehicle, assigning the first teleoperations arrangement to remotely monitor the vehicle and causing a first communication link to be established between the first teleoperations arrangement and the vehicle;
   monitoring the first teleoperations arrangement and the vehicle while the first teleoperations arrangement is assigned to remotely monitor the vehicle; and
   in response to determining that the first teleoperations arrangement is not operating at an acceptable level, verifying that the vehicle successfully executed an autonomous safe pullover maneuver to come to a stop.

2. The method of claim 1 wherein monitoring the first teleoperations arrangement and the vehicle includes assessing whether the first teleoperations arrangement's hardware or software equipment continues to meet a standard.

3. The method of claim 1 wherein monitoring the first teleoperations arrangement and the vehicle includes assessing whether the first operator of the first teleoperations arrangement is exhibiting anomalous behavior.

4. The method of claim 1 wherein in response to determining that the first teleoperations arrangement is not operating at the acceptable level, the method further includes:
verifying that a second operator of a second teleoperations equipment is certified and performing one or more assessments of the second teleoperations arrangement's hardware or software;
assigning the second teleoperations arrangement to remotely monitor the vehicle and causing a second communication link to be established between the second teleoperations arrangement and the vehicle; and
monitoring the second teleoperations arrangement and the vehicle while the second teleoperations arrangement is assigned to remotely monitor the vehicle.

5. The method of claim 4 further including:
notifying at least the second teleoperations arrangement that the vehicle is available to be monitored; and
obtaining a second request to monitor the vehicle from the second teleoperations arrangement after notifying the second teleoperations arrangement that the vehicle is available to be monitored.

6. The method of claim 1 further including:
providing a training to the first operator using the teleoperations platform before obtaining the first request, wherein providing the training includes assessing the readiness of the first operator to operate the first teleoperations arrangement.

7. A non-transitory storage medium encoded with code devices that, when executed by at least one processor of a teleoperations platform, cause the teleoperations platform to perform operations comprising:
identifying a vehicle, the vehicle being arranged to be remotely monitored using teleoperations;
obtaining a first request from a first teleoperations arrangement to remotely monitor the vehicle, the first teleoperations arrangement being remotely located from both the teleoperations platform and the vehicle;
determining whether to accept the first request from the first teleoperations arrangement to remotely monitor the vehicle, wherein determining whether to accept the first request from the first teleoperations arrangement includes verifying that a first operator of the first teleoperations arrangement is certified and performing one or more assessments of the first teleoperations arrangement's hardware or software;
in response to determining to accept the first request from the first teleoperations arrangement to remotely monitor the vehicle, assigning the first teleoperations arrangement to remotely monitor the vehicle and causing a first communication link to be established between the first teleoperations arrangement and the vehicle;
monitoring the first teleoperations arrangement and the vehicle while the first teleoperations arrangement is assigned to remotely monitor the vehicle; and
in response to determining that the first teleoperations arrangement is not operating at an acceptable level, verifying that the vehicle successfully executed an autonomous safe pullover maneuver to come to a stop.

8. The non-transitory storage medium encoded with code devices of claim 7 wherein monitoring the first teleoperations arrangement and the vehicle includes assessing whether the first teleoperations arrangement's hardware or software continues to meet a standard.

9. The non-transitory storage medium encoded with code devices of claim 7 wherein monitoring the first teleoperations arrangement and the vehicle includes assessing whether the first operator of the first teleoperations arrangement is exhibiting anomalous behavior.

10. The non-transitory storage medium encoded with code devices of claim 7 wherein in response to determining that the first teleoperations arrangement is not operating at the acceptable level, the non-transitory storage medium is further arranged to cause the at least one processor to perform operations including:
verifying that a second operator of a second teleoperations equipment is certified and performing one or more assessments of the second teleoperations arrangement's hardware or software;
assigning the second teleoperations arrangement to remotely monitor the vehicle and causing a second communication link to be established between the second teleoperations arrangement and the vehicle; and
monitoring the second teleoperations arrangement and the vehicle while the second teleoperations arrangement is assigned to remotely monitor the vehicle.

11. The non-transitory storage medium encoded with code devices of claim 10 wherein the non-transitory storage medium is further arranged to cause the at least one processor to perform operations including:
notifying at least the second teleoperations arrangement that the vehicle is available to be monitored; and
obtaining a second request to monitor the vehicle from the second teleoperations arrangement after notifying the second teleoperations arrangement that the vehicle is available to be monitored.

12. A teleoperations platform for managing a distributed teleoperations system comprising:
one or more processors;
one or more memory resources storing instructions that, when executed by the one or more processors of the teleoperations platform, cause the teleoperations platform to:
identify a first machine to be remotely monitored by the distributed teleoperations system;
obtain a first request from a first teleoperations arrangement to remotely monitor the first machine;
determine whether to accept the first request from the first teleoperations arrangement to remotely monitor the first machine, wherein determining whether to accept the first request from the first teleoperations arrangement includes verifying that a first operator of the first teleoperations arrangement is certified and performing one or more assessments of the first teleoperations arrangement's hardware or software;
in response to determining to accept the first request from the first teleoperations arrangement to remotely monitor the first machine, assign the first teleoperations arrangement to remotely monitor the first machine;
monitor the first teleoperations arrangement and the first machine while the first teleoperations arrangement is assigned to remotely monitor the first machine; and
in response to determining that the first teleoperations arrangement is not operating at an acceptable level, verify that the first machine successfully executed an autonomous safe pullover maneuver to come to a stop.

13. The teleoperations platform of claim 12, wherein, in response to determining to accept the first request from the first teleoperations arrangement to remotely monitor the first machine, the executed instructions further cause the teleoperations platform to verify that a first operator of the first teleoperations arrangement is certified.

14. The teleoperations platform of claim 12, wherein, in response to determining to accept the first request from the first teleoperations arrangement to remotely monitor the first machine, the executed instructions further cause the teleoperations platform to causing a first communication link to be established between the first teleoperations arrangement and the first machine.

15. The teleoperations platform of claim 12, wherein the first teleoperations arrangement is remotely located from a second teleoperations arrangement.

16. The teleoperations platform of claim 15, wherein the second teleoperations arrangement is assigned to monitor a second machine by the teleoperations platform.

17. The teleoperations platform of claim 16, wherein the first and second teleoperations arrangements are each remotely located from the teleoperations platform, the first machine, and the second machine.

18. The teleoperations platform of claim 12, wherein the first machine is a vehicle.

19. The teleoperations platform of claim 12, wherein the first machine is a robotic device.

20. The teleoperations platform of claim 12, wherein determining that the first teleoperations arrangement is not operating at an acceptable level includes one of more of: (i) determining that a connection speed associated with a communication link established between the first teleoperations arrangement and the first machine is not adequate, or (ii) determining that the first operator of the first teleoperations arrangement is not performing adequately.

* * * * *